US008468533B2

(12) United States Patent  
Miyazaki et al.

(10) Patent No.: US 8,468,533 B2
(45) Date of Patent: Jun. 18, 2013

(54) VIRTUAL MACHINE CONTROL DEVICE, METHOD, AND PROGRAM WHEREIN A SWITCHING TASK USED TO SWITCH TO THE HIGHEST PRIORITY VIRTUAL MACHINES IS THE HIGHEST PRIORITY TASK IN THE CURRENT VIRTUAL MACHINE AND THE VIRTUAL MACHINE THAT IS THE SWITCHING TARGET

(75) Inventors: Ryota Miyazaki, Osaka (JP); Masahiko Saito, Kanagawa (JP); Kazuomi Kato, Kyoto (JP)

(73) Assignee: Panasonic Corporation, Osaka (JP)

( * ) Notice: Subject to any disclaimer, the term of this patent is extended or adjusted under 35 U.S.C. 154(b) by 618 days.

(21) Appl. No.: 12/666,490

(22) PCT Filed: Apr. 22, 2009

(86) PCT No.: PCT/JP2009/001828
§ 371 (c)(1),
(2), (4) Date: Dec. 23, 2009

(87) PCT Pub. No.: WO2009/133669
PCT Pub. Date: Nov. 5, 2009

(65) Prior Publication Data
US 2010/0333100 A1    Dec. 30, 2010

(30) Foreign Application Priority Data
Apr. 28, 2008 (JP) ................................ 2008-116799

(51) Int. Cl.
*G06F 9/46* (2006.01)
*G06F 9/48* (2006.01)

(52) U.S. Cl.
USPC ........................................................ 718/103

(58) Field of Classification Search
USPC ................................ 718/1, 10, 103, 104, 107
See application file for complete search history.

(56) References Cited

U.S. PATENT DOCUMENTS

| 2004/0181791 | A1* | 9/2004 | Hayashi ........................ 718/100 |
| 2004/0268347 | A1* | 12/2004 | Knauerhase et al. ............. 718/1 |
| 2005/0149933 | A1* | 7/2005 | Saito et al. ..................... 718/100 |
| 2007/0006228 | A1* | 1/2007 | Grobman et al. ................. 718/1 |
| 2009/0198766 | A1* | 8/2009 | Chen et al. ..................... 709/202 |

FOREIGN PATENT DOCUMENTS

| JP | 2000-242512 | 9/2000 |
| JP | 2004-252761 | 9/2004 |
| JP | 2005-173643 | 6/2005 |
| JP | 2007-164421 | 6/2007 |

OTHER PUBLICATIONS

International Search Report issued Jul. 14, 2009 in International (PCT) Application No. PCT/JP2009/001828.

* cited by examiner

*Primary Examiner* — Thomas Lee
*Assistant Examiner* — Robert Cassity
(74) *Attorney, Agent, or Firm* — Wenderoth, Lind & Ponack, L.L.P.

(57) ABSTRACT

In a case where a task execution unit of a first virtual machine executes a dummy task according to task scheduling by an operating system, it notifies a virtual machine control unit of a priority acquired by a priority acquisition unit and a switching indication to switch the first virtual machine currently in operation to a second virtual machine. The virtual machine control unit receives the priority and the switching indication notified by the task execution unit and switches the first virtual machine currently in operation to the second virtual machine.

12 Claims, 12 Drawing Sheets

FIG.2

| TASK ID | TASK STATE | TASK PRIORITY |
|---|---|---|
| FIRST TASK | WAIT STATE | 25 |
| SECOND TASK | EXECUTABLE STATE | 15 |
| THIRD TASK | EXECUTABLE STATE | 5 |
| DUMMY TASK | EXECUTION STATE | 10 |

FIG.3

| IDENTIFIER | TARGET VIRTUAL MACHINE |
|---|---|
| A | FIRST VIRTUAL MACHINE |
| B | SECOND VIRTUAL MACHINE |

FIG.8

| INTERRUPTION CAUSE | TARGET VIRTUAL MACHINE |
|---|---|
| A | FIRST VIRTUAL MACHINE |
| B | FIRST VIRTUAL MACHINE |
| C | FIRST VIRTUAL MACHINE |
| D | SECOND VIRTUAL MACHINE |

FIG.10

PRIORITY TABLE FOR FIRST VIRTUAL MACHINE

| INTERRUPTION HANDLER | PRIORITY |
|---|---|
| FIRST INTERRUPTION HANDLER | 1 |
| SECOND INTERRUPTION HANDLER | 3 |
| THIRD INTERRUPTION HANDLER | 5 |

~T1

PRIORITY TABLE FOR SECOND VIRTUAL MACHINE

| INTERRUPTION HANDLER | PRIORITY |
|---|---|
| FOURTH INTERRUPTION HANDLER | 1 |
| FIFTH INTERRUPTION HANDLER | 2 |
| SIXTH INTERRUPTION HANDLER | 4 |

~T2

VIRTUAL MACHINE CONTROL DEVICE, METHOD, AND PROGRAM WHEREIN A SWITCHING TASK USED TO SWITCH TO THE HIGHEST PRIORITY VIRTUAL MACHINES IS THE HIGHEST PRIORITY TASK IN THE CURRENT VIRTUAL MACHINE AND THE VIRTUAL MACHINE THAT IS THE SWITCHING TARGET

BACKGROUND OF THE INVENTION

1. Technical Field

The present invention relates to a virtual machine control device, a virtual machine control method, and a virtual machine control program configured to control the execution of a plurality of virtual machines on a single physical computing machine, and more particularly, to a virtual machine control device, a virtual machine control method, and a virtual machine control program configured to switch a plurality of virtual machines.

2. Background Art

In order to meet the performance upgrade of micro processors, a virtual technique of executing a plurality of virtual machines (virtual computing machines achieved by software) on a single physical computing machine is used as a technique of utilizing hardware efficiently. Hereinafter, the physical computing machine is referred to as an information processor.

For an embedded device like a household electrical appliance, it is required to satisfy both the multi-functionality, such as GUI (Graphical User Interface) and multimedia processing, and the real time performance, such as device control and synchronous communications. Two types of processing are satisfied by executing a virtual machine fitted for the multi-functionality, such as multi-media processing, and a virtual machine fitted for the real time performance while switching one from the other on a single information processor.

As a method of switching virtual machines in the related art, there is a method by which a virtual machine having an OS (Operating System) with emphasis on the real time performance is executed preferentially and a virtual machine currently in operation is switched to another virtual machine while this OS is in an idle state. Also, there is a method by which fixed priorities are assigned to a plurality of virtual machines and virtual machines are scheduled using the priorities.

According to the method of always putting a virtual machine having an OS with emphasis on the real time performance ahead of the others, even when important processing is generated in another virtual machine, this important processing cannot be performed immediately. Also, according to the method of scheduling virtual machines using the fixed priorities, it is difficult to perform processing with emphasis on the real time performance using more than one virtual machine.

As a method in the related art to solve this problem, there is a technique of changing priorities of the virtual machines according to the processing to be performed (for example, see Patent Literature 1). More specifically, in the related art, priorities of tasks to be executed by the respective virtual machines are set to the priorities of the corresponding virtual machines. Priorities of tasks are values used for the task scheduling by the OS. In a case where a given virtual machine is to execute a task having a higher priority, the priority of this virtual machine also becomes higher. Hence, the switching to the virtual machine having a higher priority takes place and the task with a higher priority is executed.

According to the configuration in the related art, however, a virtual machine (OS) currently in execution is suspended each time the task scheduling is performed by the OS and an OS switching program that controls the switching of a plurality of virtual machines is run to determine a virtual machine to be executed next. In other words, the related art has a problem that even in a case where the processing returns to the same suspended virtual machine, processing to suspend and resume the virtual machine is generated.

CITATION LIST

Patent Literature

Patent Literature 1: JP-A-2000-242512

SUMMARY OF THE INVENTION

The invention was devised to solve the problems discussed above and has an object to provide a virtual machine control device, a virtual machine control method, a virtual machine control program capable of reducing overheads needed to switch virtual machines.

A virtual machine control device according to an aspect of the invention includes: a plurality of virtual machines each having an operating system that carries out scheduling of tasks to be executed according to priorities of the tasks, and a virtual machine control unit that controls switching of the plurality of virtual machines. Each of the plurality of virtual machines includes a task execution unit that executes a switching task to perform switching processing by which a virtual machine currently in operation is switched to another virtual machine as a switching target, a priority acquisition unit that acquires a priority of a task having a highest priority among executable tasks in the currently running virtual machine, and a priority setting unit that sets the priority acquired by the priority acquisition unit of the another virtual machine to a priority of the switching task. The task execution unit notifies the virtual machine control unit of the priority acquired by the priority acquisition unit and a switching indication to switch the virtual machine currently in operation to the another virtual machine in a case where the switching task is executed according to task scheduling by the operating system. The virtual machine control unit receives the priority and the switching indication notified by the task execution unit and switches the virtual machine currently in operation to the another virtual machine.

According to this configuration, each of a plurality of virtual machines includes an operating system that carries out scheduling of tasks to be executed according to priorities of the tasks and the virtual machine control unit controls the switching of a plurality of virtual machines. The task execution unit executes a switching task to perform switching processing by which a virtual machine currently in operation is switched to another virtual machine as a switching target. The priority acquisition unit acquires the priority of a task having a highest priority among executable tasks in the currently running virtual machine. The priority setting unit sets the priority acquired by the priority acquisition unit of another virtual machine to a priority of the switching task. In a case where the task execution unit executes the switching task according to the task scheduling by the operating system, it notifies the virtual machine control unit of the priority acquired by the priority acquisition unit and a switching indication to switch a virtual machine currently in operation to another virtual machine. The virtual machine control unit receives the priority and the switching indication notified by the task execution unit and switches the virtual machine currently in operation to another virtual machine.

Accordingly, the priority of the task having the highest priority for another virtual machine is set to the priority of the switching task and the switching task is executed only when the virtual machines are switched. The number of processing times to suspend and resume the virtual machine can be thus reduced, which makes it possible to reduce overheads needed to switch the virtual machines.

The above and other objects, features, and advantages of the invention will become more apparent from the following detailed description with reference to the accompanying drawings.

BRIEF DESCRIPTION OF THE DRAWINGS

FIG. 2 is a view showing an example of a task management table according to the first embodiment of the invention.

FIG. 3 is a view showing an example of a virtual machine identifier table according to the first embodiment of the invention.

FIG. 8 is a view showing an example of an interruption table according to the second embodiment of the invention.

FIG. 10 is a view showing an example of a priority table according to the second embodiment of the invention.

DESCRIPTION OF THE INVENTION

Hereinafter, embodiments of the invention will be described with reference to the accompanying drawings. It should be appreciated that embodiments below are illustrative to show the embodied invention and are not restrictive to limit the technical scope of the invention.
First Embodiment FIG. 1 is a block diagram showing the configuration of an information processor according to a first embodiment of the invention.

Figure 1:
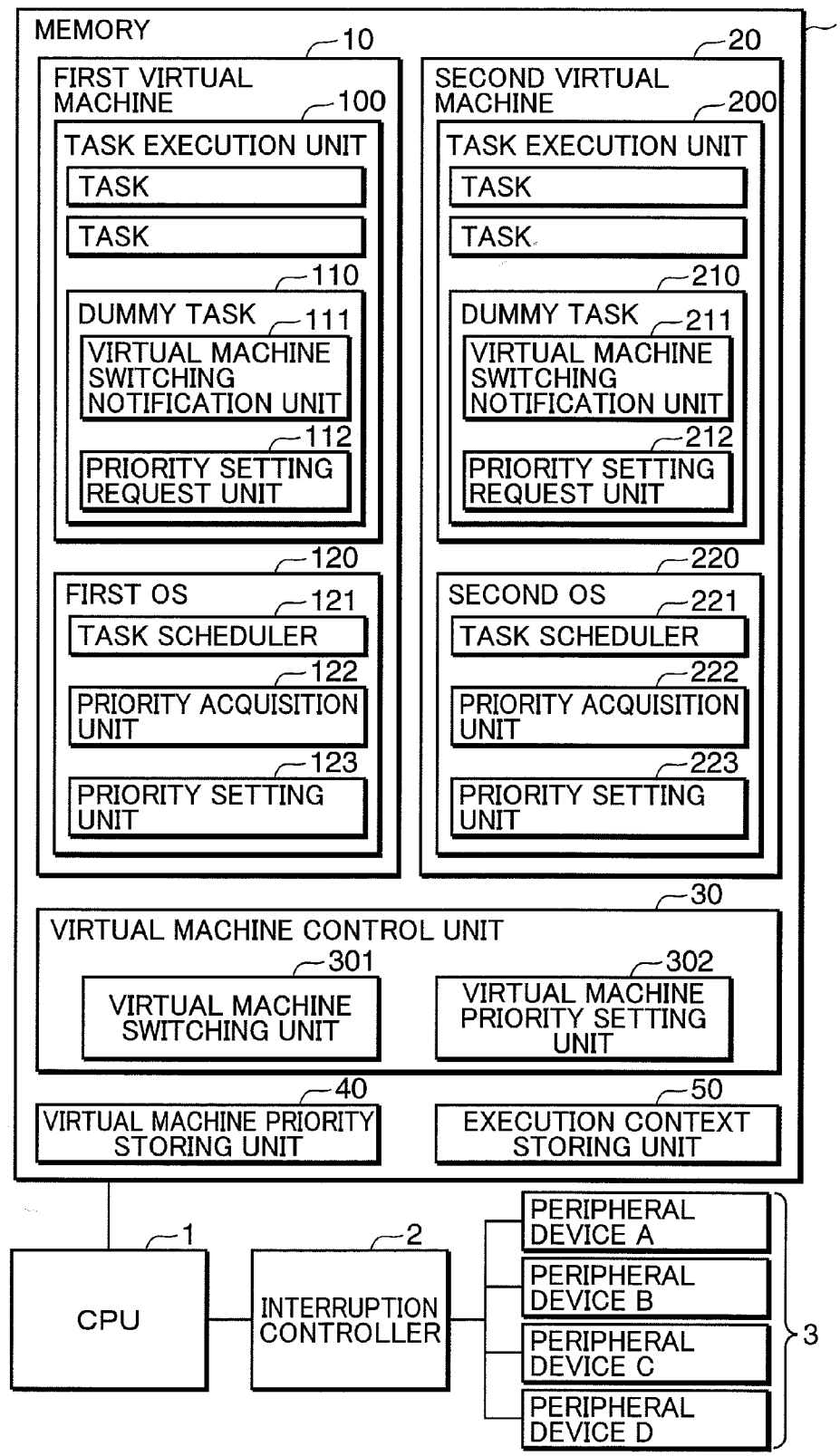
FIG. 1 is a block diagram showing the configuration of an information processor according to a first embodiment of the invention.

The information processor shown in FIG. 1 includes a CPU (Central Processing Unit) 1, an interruption controller 2, peripheral devices 3, and a memory 4.

Any CPU having sufficient processing power is available as the CPU 1. The interruption controller 2 notifies the CPU 1 of an interruption request outputted from the peripheral devices 3.

The peripheral devices 3 are various input and output devices and devices that suit the intended use of the information processor are used. For example, the peripheral devices 3 can be a key device, a communication device, a display device, a decoder, an encoder, a DSP (Digital Signal processor), or a DMA (Direct Memory Access) controller.

The memory 4 includes a first virtual machine 10, a second virtual machine 20, a virtual machine control unit 30, a virtual machine priority storing unit 40, and an execution context storing unit 50. A memory of an arbitrary type, such as a read only memory (ROM), a random access memory (RAM), and a flash memory, is available as the memory 4. Also, the memory 4 is not necessarily formed of a single memory device and it may be a combination of a plurality of memories of the same type or a combination of a plurality of memories of different types. Further, an external memory device, for example, a hard disk, may be provided besides the memory 4, so that the content of the memory 4 is transferred to the external memory device to the extent that no problem occurs in operations of the information processor.

In a case where the first virtual machine 10, the second virtual machine 20, the virtual machine control unit 30, the virtual machine priority storing unit 40, and the execution context storing unit 50 are present on the memory 4, they are present as a virtual machine control program, and by running the virtual machine control program on the CPU 1, the CPU 1 functions as the first virtual machine 10, the second virtual machine 20, the virtual machine control unit 30, the virtual machine priority storing unit 40, and the execution context storing unit 50.

The first virtual machine 10 includes a task execution unit 100 that executes one or more task including a dummy task 110 and a first OS 120. Priorities are set to all the respective tasks including the dummy task 110. The first OS 120 performs the scheduling of tasks to be executed according to the priorities of the tasks.

The task execution unit 100 executes tasks sequentially according to the priorities preliminarily set to the respective tasks. Also, the task execution unit 100 executes the dummy task 110 in order to perform switching processing by which a virtual machine currently in operation is switched to another virtual machine as a switching target.

The dummy task 110 is a task that reflects the priority of the second virtual machine 20 and includes a virtual machine switching notification unit 111 and a priority setting request unit 112.

The virtual machine switching notification unit 111 outputs a top-priority task priority acquisition request to the first OS 120. The first OS 120 acquires the priority of the top-priority task to be executed with the highest priority among the tasks. Subsequently, the virtual machine switching notification unit 111 outputs a virtual machine switching notice to the virtual machine control unit 30, so that the processing is transferred to the virtual machine control unit 30 by suspending the first virtual machine 10. The virtual machine switching notice contains the acquired priority of the top-priority task, an identifier of the switching source virtual machine (herein, the first virtual machine 10), and an identifier of the switching destination virtual machine (herein, the second virtual machine 20).

Accordingly, the switching processing from the first virtual machine 10 to the second virtual switching machine 20 is performed at the timing when the execution order of the dummy task 110 comes according to the task scheduling by the first OS 120. A target of the top-priority task is a task that is likely to be scheduled next except for the task in an execution state. In short, the dummy task in an execution state is not handled as the top-priority task.

When the suspended dummy task 110 (first virtual machine 10) is resumed, the priority setting request unit 112 transmits a priority setting request to set a priority to the dummy task 110 to the first OS 120. Also, when the setting of the priority of the dummy task 110 is completed, the priority setting request unit 112 receives a priority setting completion notice from the first OS 120 and ends the processing of the dummy task 110. Thereafter, the processing of the task to be executed next is started according to the task scheduling by the first OS 120. The priority of the top-priority task for the second virtual machine 20 at the timing at which the switching from the second virtual machine 20 to the first virtual machine 10 took place is set to the priority of the dummy task 110 at the completion.

The first OS 120 includes a task scheduler 121, a priority acquisition unit 122, and a priority setting unit 123.

The task scheduler 121 carries out the scheduling of the execution order of tasks under the charge of the first OS 120. Tasks subject to scheduling include the dummy task 110. The task scheduler 121 holds a task management table to manage tasks.

FIG. 2 is a view showing an example of the task management table according to the first embodiment of the invention. The task management table shown in FIG. 2 is an example in which a task ID, a task state, and a task priority are set forth as management information of each task. The task ID is an identifier that makes each task identifiable and only has to determine a task uniquely. The task state indicates a current state of each task and there are three states: an execution state, an executable state, and a wait state. The execution state indicates that a task is in execution and it never happens that a plurality of tasks are in the execution state at the same time. The executable state indicates that a task can be executed by the task scheduler 121 when the execution of another task ends. The wait state is a state where a task self-suspends until the condition, such as semaphore, event, and wait for wakeup task, is satisfied.

The task priority indicates the priority of a task. In FIG. 2, the task priority is indicated by a numerical value and the priority becomes higher as the numerical value becomes smaller. It should be appreciated that the task priority may be expressed by information other than the numerical value. In addition, the task priority is acquired from the task structure by using a service of the OS, for example, a ps command in the UNIX (registered trademark) OS and stored in the task management table.

The priority acquisition unit 122 receives the top-priority task priority acquisition request from the dummy task 110 and acquires the priority of the top-priority task having the highest priority among executable tasks for the first virtual machine 10 to which the priority acquisition unit 122 per se belongs by referring to the task management table described above. The priority acquisition unit 122 then returns the acquired priority to the dummy task 110. It should be noted that the top-priority task is selected among tasks other than a task whose task state indicates an execution state. The dummy task 110 is therefore always excluded from the top-priority task.

The priority setting unit 123 receives the priority setting request from the dummy task 110 and sets the priority of the dummy task 110. The priority setting unit 123 sets the priority acquired by the priority acquisition unit 222 of the second virtual machine 20 to the priority of the dummy task 110. To be more concrete, the priority setting unit 123 acquires the priority of the top-priority task for the second virtual machine 20 stored in the virtual machine priority storing unit 40 and updates the priority of the dummy task 110 in the task management table described above with the acquired priority. When the setting of the priority of the dummy task 110 is completed, the priority setting unit 123 transmits the priority setting completion notice to the dummy task 110.

In a case where the virtual machine switching notification unit 111 executes the dummy task 110 according to the task scheduling by the operating system, it notifies the virtual machine control unit 30 of the priority acquired by the priority acquisition unit 122 and a switching indication to switch the first virtual machine 10 currently in operation to the second virtual machine 20.

The second virtual machine 20 includes a task execution unit 200 that executes one or more task including a dummy task 210 and a second OS 220. Priorities are set to all the respective tasks including the dummy task 210. The second OS 220 performs scheduling of tasks to be executed according to the priorities of the tasks.

The task execution unit 200 executes tasks sequentially according to the priorities preliminarily set to the respective tasks. Also, the task execution unit 200 executes the dummy task 210 in order to perform switching processing by which a virtual machine currently in operation is switched to another virtual machine as a switching target.

The dummy task 210 is a task that reflects the priority of the first virtual machine 10 and includes a virtual machine switching notification unit 211 and a priority setting request unit 212. The virtual machine switching notification unit 211 is furnished with the same capability as the virtual machine switching notification unit 111 described above. Also, the priority setting request unit 212 is furnished with the same capability as the priority setting request unit 112 described above.

The second OS 220 includes a task scheduler 221, a priority acquisition unit 222, and a priority setting unit 223. The task scheduler 221 is furnished with the same capability as the task scheduler 121 described above. Also, the priority acquisition unit 222 is furnished with the same capability as the priority acquisition unit 122 described above. Also, the priority setting unit 223 is furnished with the same capability as the priority setting unit 123 described above.

Accordingly, the switching processing from the second virtual machine 20 to the first virtual switching machine 10 is performed at the timing when the execution order of the dummy task 210 comes according to the task scheduling by the second OS 220. The priority of the top-priority task for the first virtual machine 10 at the timing at which the switching from the first virtual machine 10 to the second virtual machine 20 took place is set to the priority of the dummy task 210 at the completion.

The dummy tasks 110 and 210 are generated at the start-up of the first and second virtual machines 10 and 20. The highest priority is set to the priorities of the dummy tasks 110 and 210 when they are generated. The task execution unit 100 generates the dummy tasks 110 and 210 at the start-up of the first and second virtual machines 10 and 20 and sets the highest priority to the priorities of the generated dummy tasks 110 and 210. Accordingly, the dummy tasks 110 and 210 in the virtual machines are executed preferentially to the other tasks, which makes it possible to set the priority of the top-priority task for the switching destination virtual machine to the priority of the dummy task.

Also, the priority acquisition units 122 and 222 and the priority setting units 123 and 223 may not be provided as the capabilities within the first and second OS's 110 and 210 and can be added later as a device driver or a library in the modular form.

Also, according to the first embodiment, the virtual machine switching notice includes the priority of a task, the identifier of the switching source virtual machine, and the identifier of the switching destination virtual machine. It should be appreciated, however, that the invention is not limited to this configuration in a case where the switching between two virtual machines is controlled. In a case where the switching between the two virtual machines is controlled, the virtual machine switching notice only has to include either one of the identifier of the switching source virtual machine and the identifier of the switching destination virtual machine.

The virtual machine control unit 30 includes a virtual machine switching unit 301 and a virtual machine priority setting unit 302 and controls the switching of a plurality of virtual machines. The virtual machine control unit 30 receives the priority and the switching indication notified by the task execution unit 100 and switches the first virtual machine 10 currently in operation to the second virtual machine 20. Also, the virtual machine control unit 30 receives the priority and the switching indication notified by the task execution unit 200 and switches the second virtual machine 20 currently in operation to the first virtual machine 10.

The virtual machine switching unit 301 receives virtual machine switching notices from the first and second virtual machines 10 and 20 and switches the virtual machines by saving and restoring execution contexts of the virtual machines. The virtual machine switching unit 301 is capable of specifying the switching source virtual machine and the switching destination virtual machine using the virtual machine switching notice. The virtual machine switching unit 301 saves the execution context of the switching source virtual machine into the execution context storing unit 50 from the CPU register and restores the execution context of the switching destination virtual machine into the CPU register from the execution context storing unit 50. Further, the virtual machine switching unit 301 directs the virtual machine priority setting unit 302 to set the priority of the switching source virtual machine. Herein, the virtual machine switching unit 301 holds a virtual machine identifier table having sets of the identifiers of the virtual machines and virtual machines corresponding to the identifiers.

FIG. 3 is a view showing an example of the virtual machine identifier table according to the first embodiment of the invention. The identifiers and the virtual machines are correlated with each other and stored in the virtual machine identifier table shown in FIG. 3. As is shown in FIG. 3, the first virtual machine 10 is correlated with an identifier A and the second virtual machine 20 is correlated with an identifier B.

The virtual machine priority setting unit 302 receives an indication from the virtual machine switching unit 301 and stores the priority contained in the virtual machine switching notice in the virtual machine priority storing unit 40 as the priority of the switching source virtual machine.

The virtual machine priority storing unit 40 stores the priority of the switching source virtual machine at the timing at which the switching of the virtual machines takes place. The priority of the virtual machine stored in the virtual machine priority storing unit 40 is the priority of the top-priority task to be executed with the highest priority among tasks for the switching source virtual machine. Herein, a target of the top-priority task is a task that is likely to be scheduled next except for the task in an execution state. In short, the dummy task is not handled as the top-priority task.

The execution context storing unit 50 stores the execution context of the switching source virtual machine. The virtual machine switching unit 301 saves the execution context of the switching source virtual machine by storing the execution context from the CPU register into the execution context storing unit 50. Also, the virtual machine switching unit 301 restores the execution context of the switching destination virtual machine by reading the execution context of the switching destination virtual machine from the execution context storing unit 50 into the CPU register. The execution context storing unit 50 stores the execution context for each virtual machine.

In a case where the virtual machine switching unit 301 receives the priority and the switching indication notified by the task execution unit 100, it saves the execution context corresponding to the first virtual machine 10 before the switching into the execution context storing unit 50 and stores the priority notified by the task execution unit 100 into the virtual machine priority storing unit 40. The execution context corresponding to the second virtual machine 20 after the switching is thus restored from the execution context storing unit 50.

The task execution unit 200 included in the second virtual machine 20 after the switching resumes the suspended dummy task 210. The priority setting unit 223 included in the second virtual machine 20 after the switching acquires the priority of the first virtual machine 10 before the switching stored in the virtual machine priority storing unit 40 and sets the acquired priority to the priority of the dummy task 210.

According to the configuration above, in the information processor of the first embedment, the virtual machine control unit 30 activates at the timing at which the priority of a virtual machine other than the virtual machine currently in execution becomes higher than the priority of the virtual machine currently in execution and the virtual machine switching processing is performed. In other words, there is no need to determine whether the switching is to be made by suspending the virtual machine currently in execution each time the OS carries out the task scheduling. Because the switching to another virtual machine always takes place in a case where the virtual machine currently in execution is suspended, the processing to instantaneously resume the same virtual machine that was operating before the suspension can be reduced. It thus becomes possible to reduce overheads caused by unnecessary suspension and resumption of the execution context.

Also, in a case where the memory spaces are switched in order to increase the safety besides the saving and restoration of the execution context, the switching of the virtual machines increases overheads further. However, according to the first embodiment, it is also possible to reduce the overheads caused by the switching of the memory spaces.

The first embodiment is particularly useful in a case where the information processor incorporates a virtual machine with emphasis on the real time performance and a virtual machine without emphasis on the real time performance. For example, the processing requiring the real time performance is loaded as a task for the first virtual machine 10 and the RTOS (real-time OS) having an excellent real time performance is employed as the first OS 120. At the same time, the processing relating to the user interface and not requiring the real time performance is loaded as a task for the second virtual machine 20 and an OS furnished with a variety of graphic processing functions is employed as the second OS 220.

According to the method in the related art, whether the switching is to be made by suspending the virtual machine with emphasis on the real time performance is determined and the result is often that the processing is returned to the virtual machine with emphasis on the real time performance. Consequently, the execution context is unnecessarily saved and restored. By contrast, the information processor of the first embodiment is able to achieve both the real time performance and the excellent user interface using a variety of graphic processing functions at the same time by reducing overheads caused by unnecessary suspension and restoration of the execution context.

It should be appreciated that the first OS 120 and the second OS 220 are not necessarily the OS's having different performances. OS's having the same performance may be used as the first OS 120 and the second OS 220.

In a case where the switching is made, for example, from the first virtual machine 10 to the second virtual machine 20, the virtual machine control unit 30 saves the execution context from the CPU register by storing the execution context, such as an IP (Instruction Pointer), a stack pointer, a general register, a base pointer, and a flag, of the first virtual machine 10 that has been operating, for use of the first virtual machine 10. Also, the virtual machine control unit 30 restores the execution context that has been stored for use of the second virtual machine 20 into the CPU register. In this manner, the virtual machine control unit 30 achieves the switching between the first and second virtual machines 10 and 20.

In the first embodiment, the information processor corresponds to an example of the virtual machine control device, the first virtual machine 10 and the second virtual machine 20 correspond to an example of a plurality of virtual machines, the virtual machine control unit 30 corresponds to an example of the virtual machine control unit, the task execution units 100 and 200 correspond to an example of the task execution unit, the priority acquisition unit 122 corresponds to an example of the priority acquisition unit, the priority setting unit 123 corresponds to an example of the priority setting unit, the execution context storing unit 50 corresponds to an example of the execution context storing unit, the virtual machine priority storing unit 40 corresponds to an example of the priority storing unit, and the dummy tasks 110 and 210 correspond to an example of the switching task.

Figure 4:
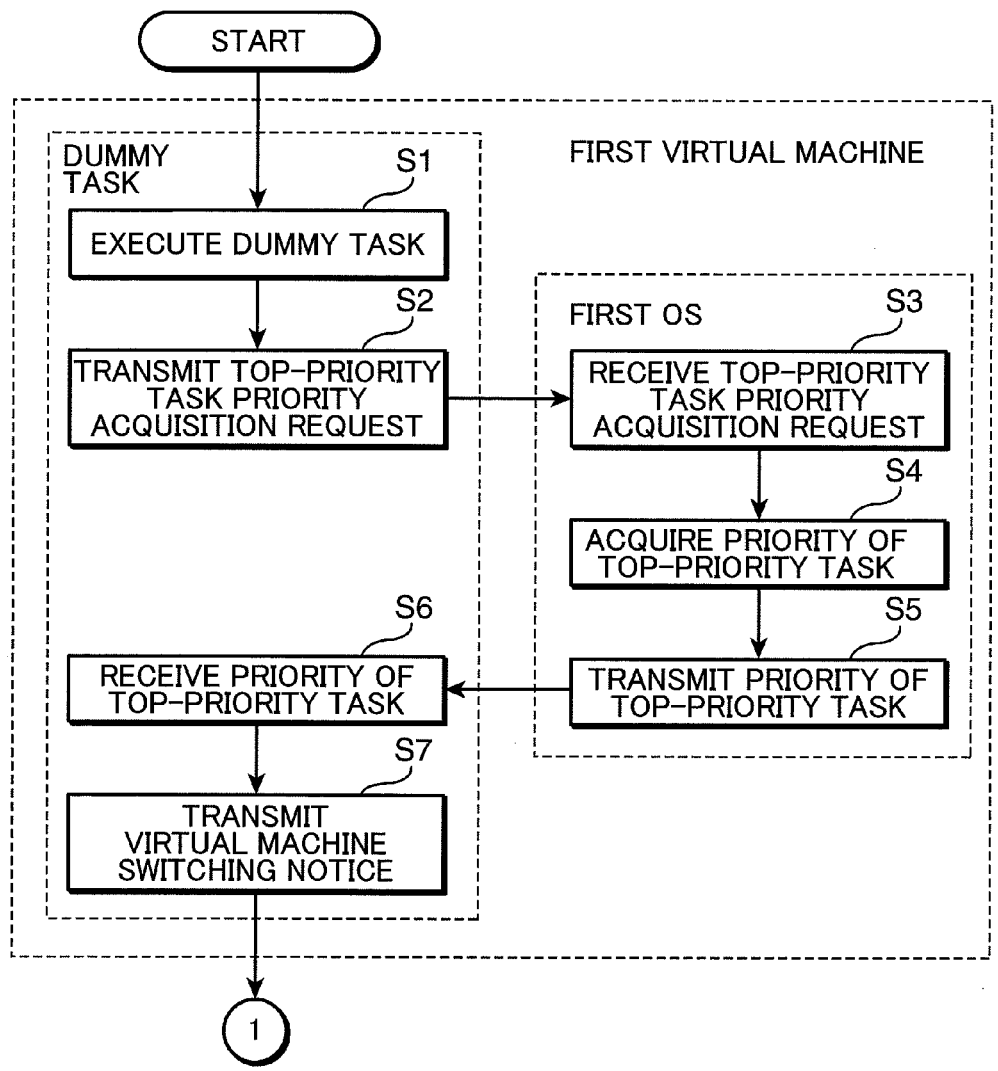
FIG. 4 is flowchart showing an example of switching processing by a first virtual machine according to the first embodiment of the invention.
Figure 5:
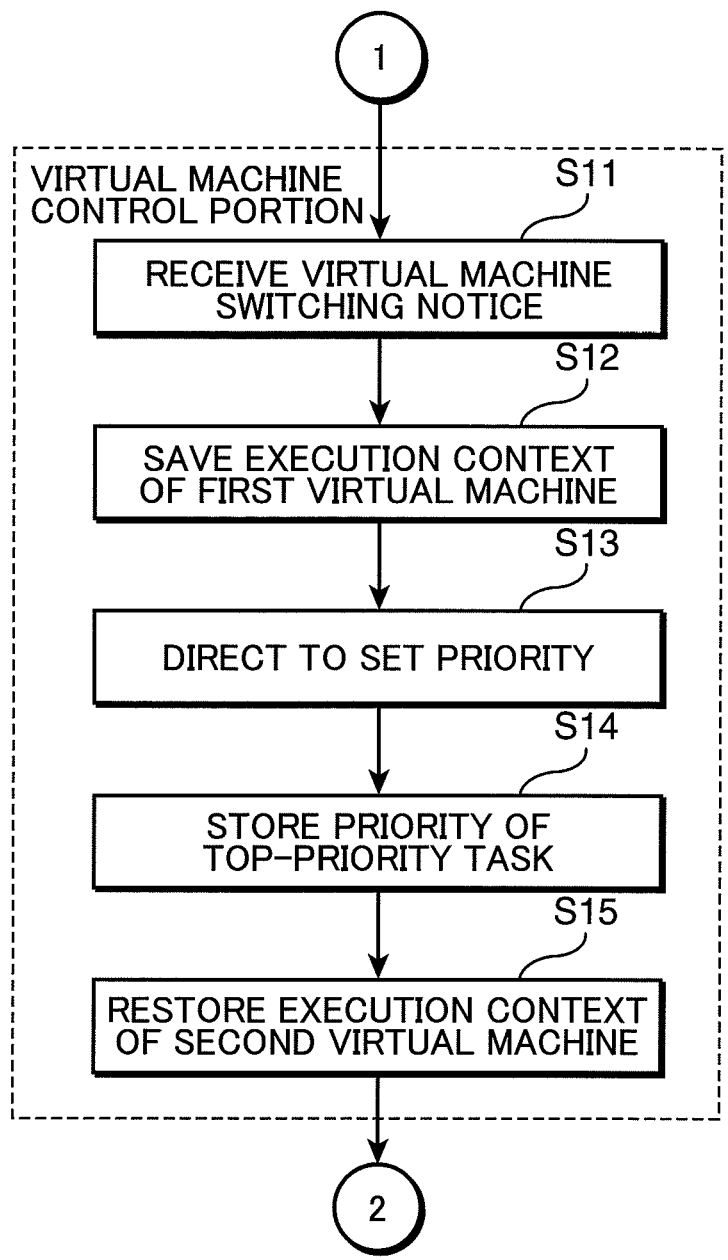
FIG. 5 is a flowchart showing an example of switching processing by a virtual machine control unit according to the first embodiment of the invention.
Figure 6:
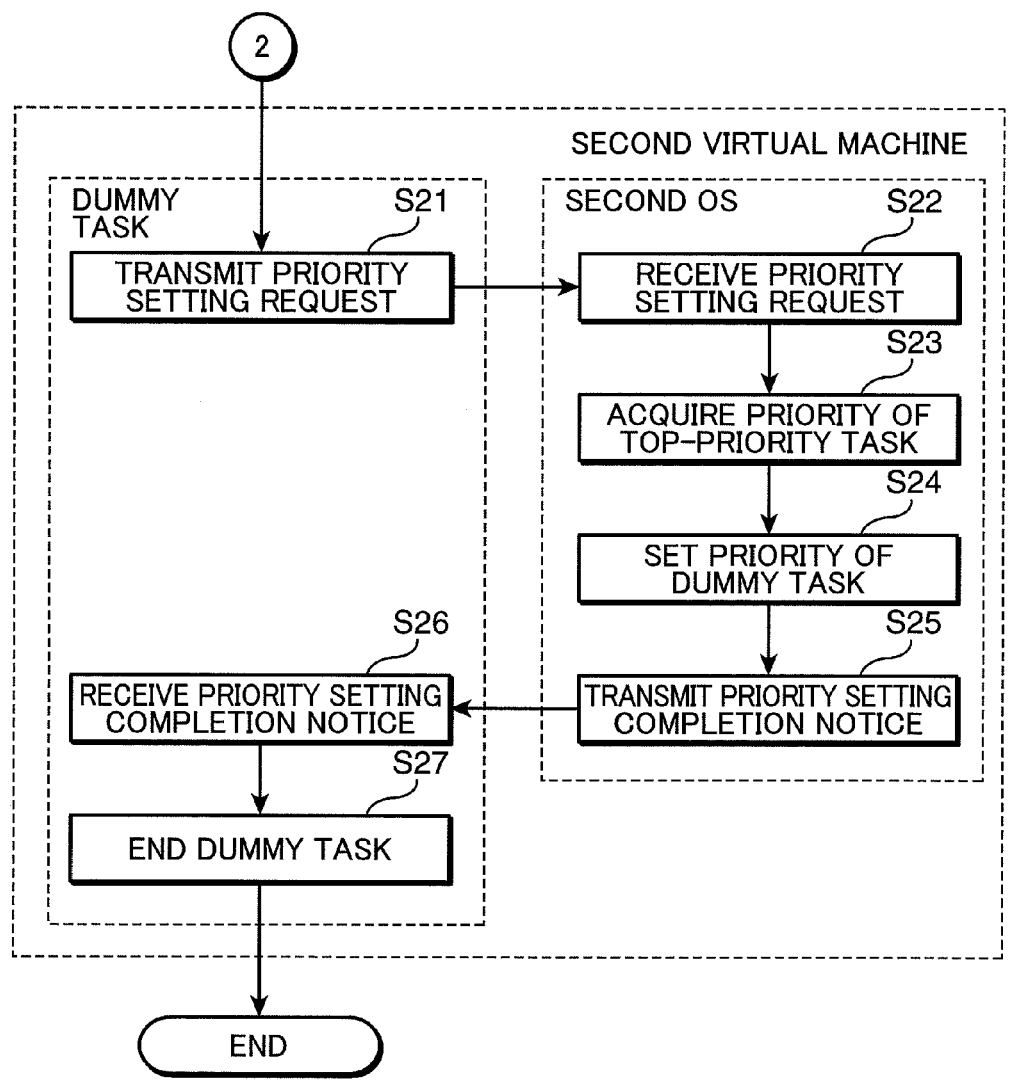
FIG. 6 is a view showing an example of switching processing by a second virtual machine according to the first embodiment of the invention.

FIG. 4 through FIG. 6 are flowcharts depicting the flow of processing by the information processor according to the first embodiment of the invention. Herein, an example of the switching operation to switch the first virtual machine 10 to the second virtual machine 20 of FIG. 1 is shown. FIG. 4 is a flowchart showing an example of the switching processing by the first virtual machine 10 according to the first embodiment of the invention. FIG. 5 is a flowchart showing an example of the switching processing by the virtual machine control unit 30 according to the first embodiment of the invention. FIG. 6 is a flowchart showing an example of the switching processing by the second virtual machine 20 according to the first embodiment of the invention.

Initially, referring to FIG. 4, the CPU 1 executes the first virtual machine 10. While the first virtual machine 10 is in execution, the task scheduler 121 of the first OS 120 carries out the task scheduling according to the task priorities in the task management table. The task scheduler 121 then selects the dummy task 110 as a task to be executed next and changes the task state of the dummy task in the task management table to an execution state. The task scheduler 121 then directs the task execution unit 100 to execute the dummy task 110. The task execution unit 100 executes the dummy task 110 at an indication from the task scheduler 121. The processing of the dummy task 110 is thus started (Step S1).

Subsequently, the virtual machine switching notification unit 111 of the dummy task 110 transmits a top-priority task priority acquisition request to the first OS 120 (Step S2).

Subsequently, the priority acquisition unit 122 of the first OS 120 receives the top-priority task priority acquisition request transmitted by the virtual machine switching notification unit 111 of the dummy task 110 (Step S3). Subsequently, the priority acquisition unit 122 acquires the priority of the task having the highest priority, that is, the priority of the task to be executed next after the dummy task 110 by the task execution unit 100 (priority of the top-priority task) by referring to the task management table (Step S4).

Subsequently, the priority acquisition unit 122 notifies the dummy task 110 of the acquired priority of the top-priority task (Step S5). For example, in a case where the task scheduler 121 has the task management table shown in FIG. 2, the priority acquisition unit 122 transmits the priority of the third task having the highest priority among the tasks whose task states are an executable state to the dummy task 110.

Subsequently, the virtual machine switching notification unit 111 of the dummy task 110 receives the priority of the top-priority task transmitted by the priority acquisition unit 122 of the first OS 120 (Step S6). Subsequently, the virtual machine switching notification unit 111 generates a virtual machine switching notice using the received priority of the top-priority task and transmits the generated virtual machine switching notice to the virtual machine control unit 30 (Step S7). The processing is thus transferred to the virtual machine control unit 30 from the dummy task 110. For example, the virtual machine switching notification unit 111 uses a software interruption. In a case where the CPU 1 detects the software interruption upon receipt of an occurrence notice of a switching interruption from the interruption controller 2, it jumps (moves) to an exception vector. The exception vector at the jump destination is then set in the virtual machine control unit 30. The virtual machine control unit 30 is thus allowed to activate at the issuance of the virtual machine switching notice.

Subsequently, referring to FIG. 5, the virtual machine switching unit 301 of the virtual machine control unit 30 receives the virtual machine switching notice transmitted by the virtual machine switching notification unit 111 (Step S11). Subsequently, the virtual machine switching unit 301 saves the execution context of the switching source first virtual machine 10 into the execution context storing unit 50 from the CPU register (Step S12).

Subsequently, the virtual machine switching unit 301 directs the virtual machine priority setting unit 302 to set the priority of the switching source first virtual machine 10 (Step S13).

Subsequently, the virtual machine priority setting unit 302 receives an indication from the virtual machine switching unit 301 and stores the priority (the priority of the top-priority task) contained in the virtual machine switching notice in the virtual machine priority storing unit 40 as the priority of the switching source virtual machine (first virtual machine 10) (Step S14). Herein, the priority to be set is contained in the virtual machine switching notice. It should be appreciated, however, that the present invention is not particularly limited to this configuration, and an argument of the software interruption or the data in a predetermined region on a shared memory may be acquired as the priority.

Subsequently, the virtual machine switching unit 301 restores the execution context of the switching destination second virtual machine 20 into the CPU register from the execution context storing unit 50 (Step S15).

The suspended second virtual machine 20 resumes as the execution context of the second virtual machine 20 is restored by the virtual machine control unit 30. Because the second virtual machine 20 is suspended in the middle of processing of the dummy task 210, it resumes the processing of the dummy task 210 from where it was suspended.

Subsequently, referring to FIG. 6, the priority setting request unit 212 of the dummy task 210 transmits a priority setting request to the second OS 220 (Step S21).

Subsequently, the priority setting unit 223 of the second OS 220 receives the priority setting request transmitted by the priority setting request unit 212 of the dummy task 210 (Step S22). The priority setting unit 223 acquires the priority of the top-priority task for the first virtual machine 10 stored in the virtual machine priority storing unit 40 (Step S23). Subsequently, the priority setting unit 223 updates (sets) the task priority of the dummy task 210 in the task management table with the acquired priority of the top-priority task (Step S24). Subsequently, the priority setting unit 223 transmits a priority setting completion notice to the dummy task 210 (Step S25).

Subsequently, the priority setting request unit 212 of the dummy task 210 receives the priority setting completion notice transmitted by the priority setting unit 223 of the second OS 220 (Step S26). Subsequently, the priority setting request unit 212 ends the execution of the dummy task 210 (Step S27). Accordingly, the task scheduler 221 of the second OS 220 carries out the task scheduling in the second virtual machine 20 and determines the task to be executed next after the dummy task 210 when the execution thereof ends.

In the manner as above, the information processor of the first embodiment generates a dummy task that represents an imitation of another virtual machine as a switching target and the priority of the task having the highest priority among those for another virtual machine as a switching target is set to the priority of this dummy task. The task scheduler of the OS brings the dummy task into an execution state at the timing at which the priority of another virtual machine becomes higher than that of the virtual machine currently in execution and the task execution potion executes the dummy task. The virtual machine control unit 30 is thus activated and the switching processing is performed. In other words, there is no need to determine whether the switching is to be made by suspending the virtual machine currently in execution each time the OS carries out the task scheduling. Because the switching to another virtual machine always takes place in a case where the virtual machine currently in execution is suspended, the processing to instantaneously resume the same virtual machine that was operating before the suspension can be reduced. In short, it becomes possible to reduce overheads caused by unnecessary suspension and resumption of the execution context.

In the first embodiment, when the first virtual machine 10 is switched to the second virtual machine 20, the priority of the top-priority task for the first virtual machine 10 is set to the priority of the dummy task of the second virtual machine 20. It should be appreciated, however, that the priority of the dummy task of the second virtual machine 20 may be changed in the middle of processing.

For example, in a case where the first OS 120 provided to the first virtual machine 10 is an RTOS and the second OS 220 provided to the second virtual machine 20 is a Linux OS, after the data is downloaded by the RTOS, the data is encoded and reproduced by the Linux OS. In this manner, in a case where the data processed in the first virtual machine 10 is processed in the second virtual machine 20 suitable to the processing of the data, it is necessary to switch the first virtual machine 10 to the second virtual machine 20 after the data is processed in the first virtual machine 10.

In this case, in Step S13 of FIG. 5, in a case where the virtual machine priority setting unit 302 is directed to set the priority of the switching source first virtual machine 10, the virtual machine switching unit 301 changes the priority to be notified to the virtual machine priority setting unit 302 to be lower than the priority of the dummy task of the first virtual machine 10 stored in the task management table. The virtual machine priority setting unit 302 then receives the indication from the virtual machine switching unit 301 and stores the changed priority into the virtual machine priority storing unit 40 as the priority of the switching source virtual machine (first virtual machine 10).

The changed priority is thus set to the priority of the dummy task of the second virtual machine 20. Because the changed priority is lower than the priority of the dummy task of the first virtual machine 10, the switching destination second virtual machine 20 is allowed to operate preferentially.

Second Embodiment

Figure 7:
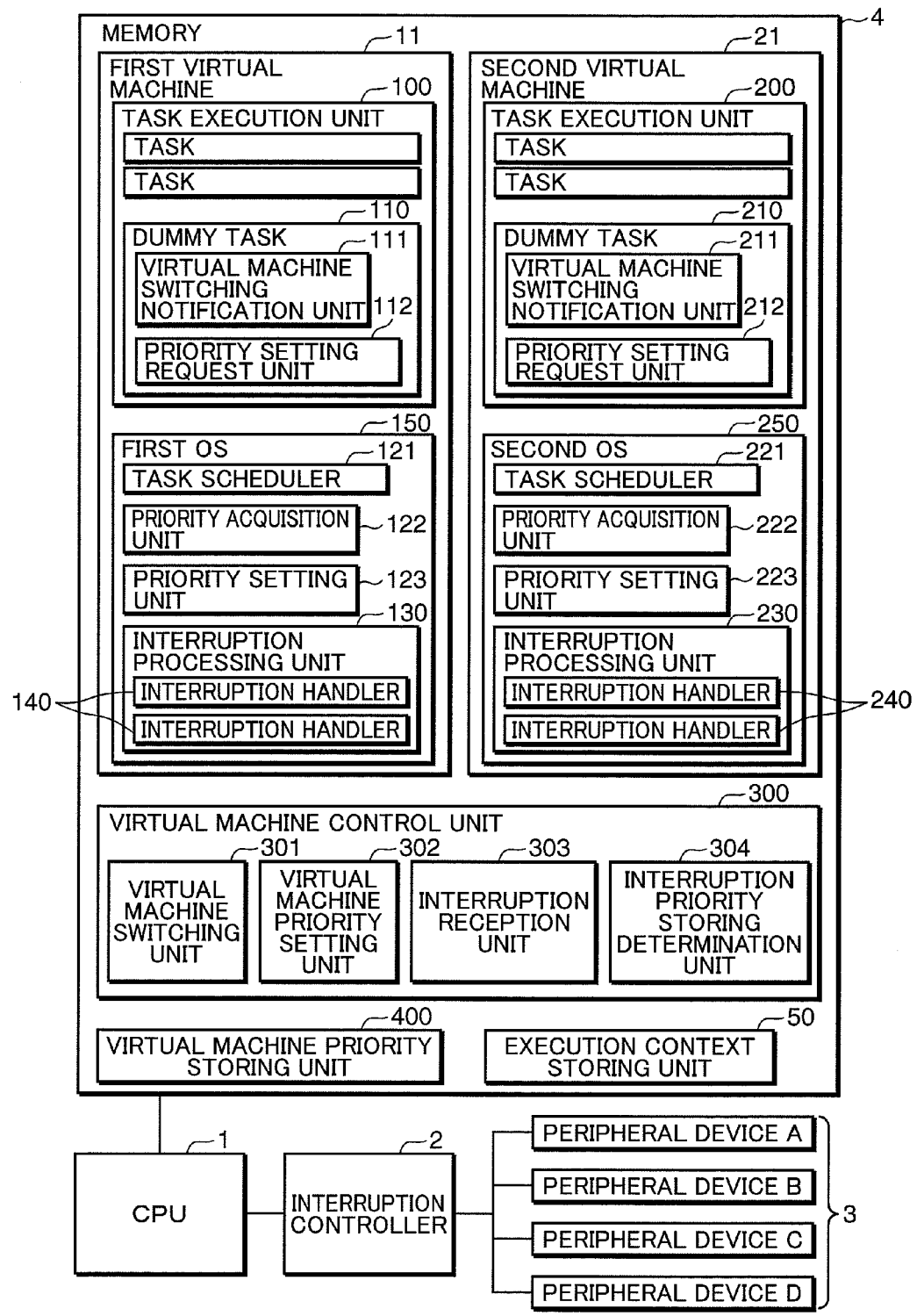
FIG. 7 is a block diagram showing the configuration of an information processor according to a second embodiment of the invention.

FIG. 7 is a block diagram showing the configuration of an information processor according to a second embodiment of the invention. In the information processor of the second embodiment shown in FIG. 7, components same as those of the information processor of the first embodiment shown in FIG. 1 are labeled with the same reference numerals and detailed descriptions of such components are omitted herein.

As with the counterpart of the first embodiment above, the information processor shown in FIG. 7 includes a CPU (Central Processing Unit) 1, an interruption controller 2, peripheral devices 3, and a memory 4.

The memory 4 includes a first virtual machine 11, a second virtual machine 21, a virtual machine control unit 300, a virtual machine priority storing unit 400, and an execution context storing unit 50.

The first virtual machine 11 includes a task execution unit 100 that executes one or more task including a dummy task 110 and a first OS 150. Priorities are set to all the respective tasks including the dummy task 110. The first OS 150 carries out the scheduling of tasks to be executed according to the priorities of the tasks. The dummy task 110 is a task that reflects the priority of the second virtual machine 21 and includes a virtual machine switching notification unit 111 and a priority setting request unit 112. The dummy task 110 is of the same configuration described in the first embodiment above.

The first OS 150 includes a task scheduler 121, a priority acquisition unit 122, a priority setting unit 123, and an interruption processing unit 130 of the same configurations as the counterparts of the first embedment described above except for the interruption processing unit 130. Herein, detailed descriptions will be given to the interruption processing unit 130 alone, which is a different component.

The interruption processing unit 130 includes one or more interruption handler 140. The interruption handler 140 represents processing to be performed after an interruption and a priority is set to each interruption handler 140. When an interruption occurs, the interruption processing unit 130 of the first OS 150 receives an interruption notice notified by the interruption controller 2 and executes the interruption handler 140 corresponding to an interruption cause.

The task scheduler 121 of the second embodiment stores a task management table to manage tasks and interruption handlers. The task management table has management information of each task and management information of each interruption handler. To be more concrete, in addition to the task ID, the task state, and the task priority, the task management table further has an interruption handler ID to identify an interruption handler, a handler state indicating the state of an interruption handler, and an interruption handler priority indicating the priority of an interruption handler.

The second virtual machine 21 includes a task execution unit 200 that executes one or more task including a dummy task 210 and a second OS 250. Priorities are set to all the respective tasks including the dummy task 210. The second OS 250 carries out the scheduling of tasks to be executed according to the priorities of the tasks. The dummy task 210 is a task that reflects the priority of the first virtual machine 11 and includes a virtual machine switching notification unit 211 and a priority setting request unit 212. The dummy task 210 is of the same configuration as the counterpart described in the first embodiment above.

The second OS 250 includes a task scheduler 221, a priority acquisition unit 222, a priority setting unit 223, and an interruption processing unit 230 of the same configurations as the counterparts described in the first embodiment above except for the interruption processing unit 230. The interruption processing unit 230 is furnished with the same capability as the interruption processing unit 130 described above.

The virtual machine control unit 300 includes a virtual machine switching unit 301, a virtual machine priority setting unit 302, an interruption reception unit 303, and an interruption priority storing determination unit 304. The virtual machine control unit 300 controls the switching of virtual machines caused by the occurrence of an interruption in addition to the switching of virtual machines according to the task scheduling.

The interruption reception unit 303 receives an interruption notice notifying an interruption to a plurality of virtual machines and determines a virtual machine as an interruption target among a plurality of virtual machines using the interruption cause contained in the interruption notice. The interruption reception unit 303 receives an interruption notice notifying the occurrence of an interruption via the CPU 1 from the interruption controller 2. The interruption reception unit 303 determines the virtual machine as an interruption target (first virtual machine 11 or second virtual machine 21) from the interruption cause contained in the received interruption notice and performs the interruption notice setting to the virtual machine as an interruption target (first virtual machine 11 or second virtual machine 21). The interruption reception unit 303 holds an interruption table having sets of interruption causes and virtual machines as an interruption target. The interruption reception unit 303 determines the virtual machine as an interruption target by referring to this interruption table.

FIG. 8 is a view showing an example of the interruption table according to the second embodiment of the invention. In the interruption table shown in FIG. 8, the first virtual machine 11 is correlated with interruption causes A, B, and C as the virtual machine as an interruption target and the second virtual machine 21 is correlated with an interruption cause D as the virtual machine as an interruption target. In the second embodiment, as is shown in FIG. 8, the interruption causes and the virtual machines as an interruption target are correlated in tabular form. It should be appreciated, however, that the invention is not particularly limited to this configuration and the interruption causes and the virtual machines as an interruption target only has to be stored in a data format, such as functions and a link format, with which the virtual machine control unit is able to determine a unique virtual machine as an interruption target.

The interruption priority storing determination unit 304 determines whether the priority correlated with the interruption cause is to be set as the priority of the virtual machine as an interruption target. At a time point when an interruption occurs, the interruption priority storing determination unit 304 determines whether the virtual machine currently in operation (first virtual machine 11 or second virtual machine 21) coincides with the virtual machine as an interruption target (first virtual machine 11 or second virtual machine 21). In a case where the virtual machine currently in operation does not coincide with the virtual machine as an interruption target, the interruption priority storing determination unit 304 directs the virtual machine priority setting unit 302 to store the priority corresponding to the interruption that has occurred into the virtual machine priority storing unit 400.

Also, the interruption priority storing determination unit 304 determines whether the virtual machine determined as an interruption target by the interruption reception unit 303 is the same as the virtual machine that was operating before the interruption. In a case where it is determined that the virtual machine as an interruption target is not the same as the virtual machine that was operating before the interruption, the virtual machine priority setting unit 302 sets the priority correlated with the interruption cause to the priority of the virtual machine as an interruption target.

In addition to the priority of the switching source virtual machine stored at the timing at which the switching of virtual machines takes place, the virtual machine priority storing unit 400 stores the priority of an occurring interruption at the timing at which the interruption occurs. The priority of the virtual machine is the priority of the top-priority task to be executed with the highest priority among tasks for the virtual machine. A target of the top-priority task is a task that is likely to be scheduled next except for the task in an execution state. In short, the dummy task is not handled as the top-priority task.

According to the configuration described above, in the information processor of the second embodiment, the virtual machine control unit 30 is activated at the timing at which the priority of another virtual machine becomes higher than that of the virtual machine currently in execution and the switching processing of virtual machines is performed. Also, in a case where the virtual machine control unit 30 is operating at the occurrence of an interruption and the interruption is for another virtual machine not in execution, the priority of the interruption is stored in the virtual machine priority storing unit 400 as the priority of the virtual machine. It thus becomes possible to achieve the switching of virtual machines according to the priorities of the interruption and the task. In other words, there is no need to determine whether the switching processing is to be performed by suspending the virtual machine currently in execution each time the OS carries out the task scheduling. Because the switching to another virtual machine always takes place in a case where the virtual machine currently in execution is suspended, the processing to instantaneously resume the same virtual machine that was operating before the suspension can be reduced. It thus becomes possible to reduce overheads caused by unnecessary suspension and resumption of the execution context.

In the second embodiment, the information processor corresponds to an example of the virtual machine control device, the first virtual machine 11 and the second virtual machine 21 correspond to an example of a plurality of virtual machines, the virtual machine control unit 300 corresponds to an example of the virtual machine control unit, the virtual machine priority setting unit 302 corresponds to an example of the virtual machine priority setting unit, the interruption reception unit 303 corresponds to an example of the interruption reception unit, the interruption priority storing determination unit 304 corresponds to an example of the interruption priority storing determination unit, and the virtual machine priority storing unit 400 corresponds to an example of the priority storing unit.

Figure 9:
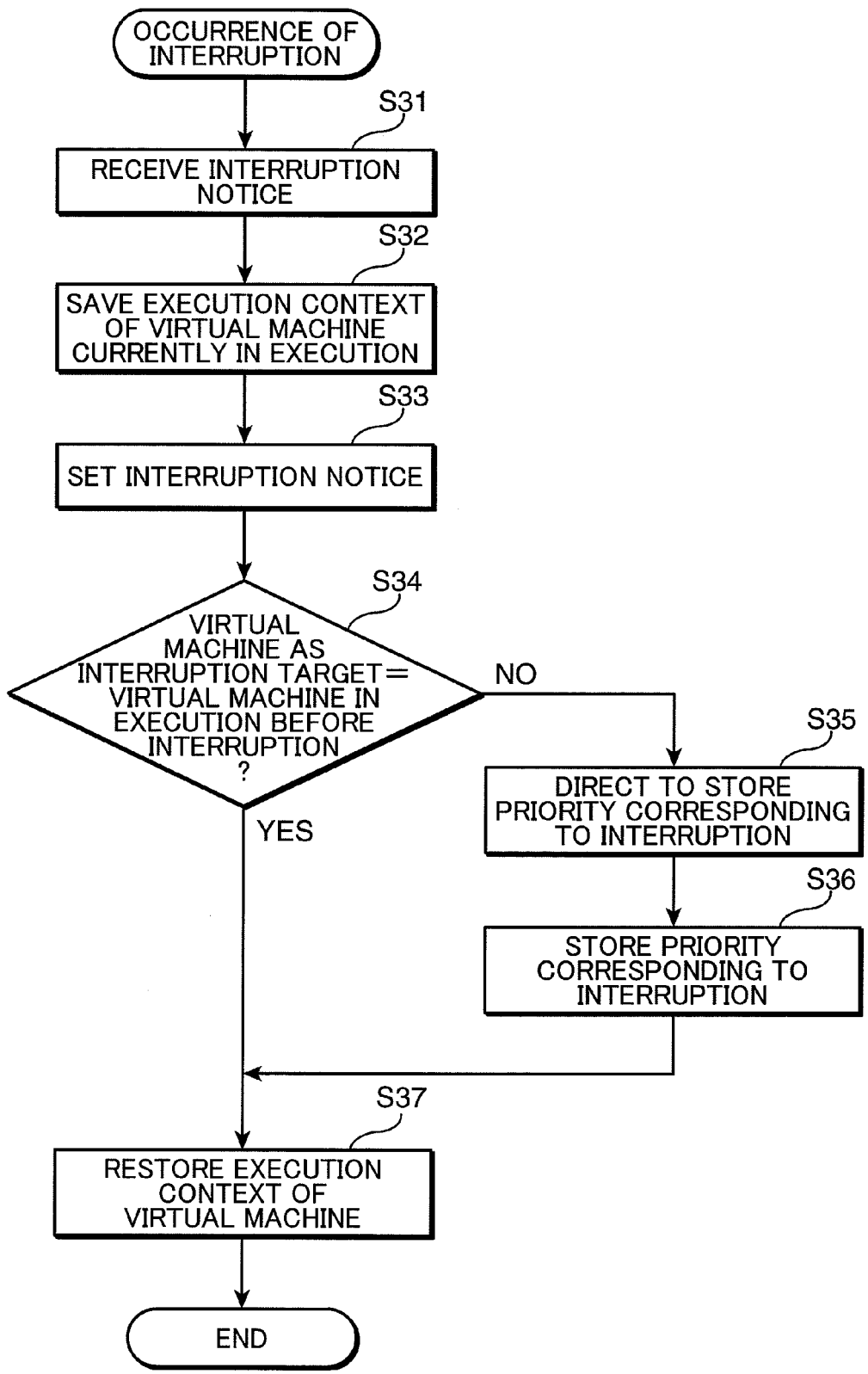
FIG. 9 is a flowchart showing an example of interruption processing by a virtual machine control unit according to the second embodiment of the invention.

FIG. 9 is a flowchart showing an example of the interruption processing by the virtual machine control unit according to the second embodiment of the invention. FIG. 9 shows an example of the operation of the virtual machine control unit 300 in the event of an interruption.

When an interruption occurs by the peripheral devices 3, the interruption controller 2 outputs an interruption notice notifying the occurrence of an interruption to the CPU 1. The interruption processing is thus started. For example, in a case where the CPU 1 detects an interruption upon receipt of the interruption occurrence notice from the interruption controller 2, it jumps (moves) to an interruption vector. The interruption vector as the jump destination is set in the virtual machine control unit 300. The virtual machine control unit 300 is thus allowed to activate at the occurrence of an interruption.

Initially, the interruption reception unit 303 of the virtual machine control unit 300 receives an interruption notice from the interruption controller 2 (Step S31). In a case where the interruption reception unit 303 receives the interruption notice, it directs the virtual machine switching unit 301 to save the execution context.

Subsequently, the virtual machine switching unit 301 saves the execution context of the virtual machine currently in operation into the execution context storing unit 50 from the CPU register and notifies the interruption reception unit 303 of the completion of the saving of the execution context (Step S32).

Subsequently, the interruption reception unit 303 determines the virtual machine as an interruption target (first virtual machine 11 or second virtual machine 21) using the interruption cause contained in the received interruption notice and performs the interruption notice setting to the virtual machine as an interruption target, after which it notifies the interruption priority storing determination unit 304 of the identifier of the virtual machine as an interruption target (Step S33).

Subsequently, the interruption priority storing determination unit 304 determines whether the virtual machine as an interruption target is the same as the virtual machine that was operating before the occurrence of the interruption using the identifier of the virtual machine as an interruption target notified from the interruption reception unit 303 (Step S34).

In a case where it is determined that the virtual machine as an interruption target is different from the virtual machine that was operating before the occurrence of the interruption (NO in Step S34), the interruption priority storing determination unit 304 directs the virtual machine priority setting unit 302 to store the priority corresponding to the interruption that has occurred into the virtual machine priority storing unit 400 (Step S35). Subsequently, the virtual machine priority setting unit 302 receives the indication from the interruption priority storing determination unit 304 and stores the priority corresponding to the interruption that has occurred into the virtual machine priority storing unit 400 (Step S36).

The interruption priority storing determination unit 304 holds the priorities of the respective interruption handlers in the form of a priority table for each virtual machine. The interruption priority storing determination unit 304 refers to the priority table and specifies the value of the priority to be set to the virtual machine priority setting unit 302.

FIG. 10 is a view showing an example of the priority table according to the second embodiment of the invention. The interruption priority storing determination unit 304 has a priority table T1 for first virtual machine and a priority table T2 for second virtual machine. In the priority table T1 for first virtual machine, first through third interruption handlers to be executed by the interruption processing unit 130 of the first virtual machine 11 are correlated with priorities preliminarily assigned to the respective first through third interruption handlers. In the priority table T2 for second virtual machine, fourth through sixth interruption handlers to be executed by the interruption processing unit 230 of the second virtual machine 21 are correlated with priorities preliminarily assigned to the respective fourth through sixth interruption handlers.

In a case where it is determined that the virtual machine as an interruption target is the same as the virtual machine that was operating before the occurrence of the interruption (YES in Step S34), or in a case where the priority corresponding to the interruption is stored into the virtual machine priority storing unit 400 after it is determined that the virtual machine as an interruption target is different from the virtual machine that was operating before the occurrence of the interruption, the interruption reception unit 303 directs the virtual machine switching unit 301 to restore the execution context saved in Step S32. The virtual machine switching unit 301 then restores the execution context of the virtual machine suspended in the middle of execution into the CPU register from the execution context storing unit 50 and completes the interruption processing (Step S37).

It may be configured in such a manner that, in Step S36, the virtual machine priority setting unit 302 compares the priority corresponding to the interruption that has occurred with the priority of the top-priority task already stored in the virtual machine priority storing unit 400 and updates the virtual machine priority storing unit 400 only in a case where the priority corresponding to the interruption that has occurred is higher than the already stored priority of the top-priority task.

To be more specific, the virtual machine priority setting unit 302 compares the priority correlated with the interruption cause with the priority stored in the virtual machine priority storing unit 400 and sets the priority correlated with the interruption cause to the priority of the virtual machine as an interruption target in a case where the priority correlated with the interruption cause is higher than the priority stored in the virtual machine priority storing unit 400.

Alternatively, it may be configured in such a manner that, in Step S36, the virtual machine priority setting unit 302 compares the priority corresponding to the interruption that has occurred with a predetermined threshold value and updates the virtual machine priority storing unit 400 only when the priority corresponding to the interruption that has occurred is higher than the predetermined threshold value.

An operation after the interruption processing in the second embodiment will now be described. Herein, descriptions will be given to a case where the interruption processing occurs while the first virtual machine 11 is in operation.

In a case where the virtual machine as an interruption target is the first virtual machine 11, after the execution context is restored in Step S37, the interruption processing unit 130 executes the interruption handler corresponding to the interruption. When the execution of the interruption handler ends, the task scheduler 121 determines the task to be executed for the first virtual machine 11 according to the priority.

Meanwhile, in a case where the virtual machine as an interruption target is the second virtual machine 21, after the execution context is restored in Step S37, the task execution unit 100 executes the tasks for the first virtual machine 11 sequentially according to the priorities. In the meantime, the switching processing depicted in FIG. 4 through FIG. 6 is stared at the timing at which the dummy task 110 is executed. In the switching processing, Steps S1 through S22 shown in FIG. 4 through FIG. 6 are performed. It should be noted that, in Step S14, the virtual machine priority storing unit 400 stores the priority contained in the virtual machine switching notice together with the already stored priority corresponding to the interruption.

In Step S23, the priority setting unit 223 acquires the priority of the top-priority task for the first virtual machine 11 stored in the virtual machine priority storing unit 400 and the priority corresponding to the interruption. Subsequently, in Step S24, the priority setting unit 223 updates the task priority of the dummy task 210 in the task management table with the acquired priority of the top-priority task and also updates the task priority of the interruption handler in the task management table with the acquired priority corresponding to the interruption. Thereafter, the processing in Steps S25 through S27 is performed and the execution of the dummy task 210 ends.

When the execution of the dummy task 210 ends, the task scheduler 221 determines the task to be executed for the second virtual machine 21 according to the priority. The interruption processing unit 230 thus executes the interruption handler corresponding to the interruption at the execution timing of the interruption handler set in the task management table. When the execution of the interruption handler ends, the task scheduler 221 determines the task to be executed for the second virtual machine 21 according to the priority.

In the manner as above, the information processor of the second embodiment generates the dummy task representing an imitation of another virtual machine as a switching target and sets the priority of the task having the highest priority for another virtual machine as a switching target to the priority of the dummy task. The task scheduler of the OS brings the dummy task into an execution state at the timing at which the priority of another virtual machine becomes higher than that of the virtual machine currently in execution and the task execution unit executes the dummy task. The virtual machine control unit 300 is thus activated and the switching processing is performed. In other words, there is no need to determine whether the switching processing is to be performed by suspending the virtual machine currently in execution each time the OS carries out the task scheduling. Because the switching to another virtual machine always takes place in a case where the virtual machine currently in execution is suspended, the processing to instantaneously resume the same virtual machine that was operating before the suspension can be reduced. In short, it becomes possible to reduce overheads caused by unnecessary suspension and resumption of the execution context.

Further, in a case where the interruption is an interruption to the virtual machine currently in execution at the occurrence of the interruption, the OS of the virtual machine currently in execution is notified of the interruption. In a case where the interruption is an interruption to another interruption not in execution, the priority of the interruption is set to the priority of the virtual machine and the virtual machine before the interruption is activated. It thus becomes possible to achieve the switching of virtual machines according to both the priority of the interruption and the priority of the task. In other words, there is no need to determine whether the switching is to be made by suspending the virtual machine currently in execution each time the OS carries out the task scheduling. Because the switching to another virtual machine always takes place in a case where the virtual machine currently in execution is suspended, the processing to instantaneously resume the same virtual machine that was operating before the suspension can be reduced. It thus becomes possible to reduce overheads caused by unnecessary suspension and resumption of the execution context.

The first and second embodiments described a case where two virtual machines are provided. It should be appreciated, however, that the invention is not particularly limited to this configuration and three or more virtual machines can be provided.

Third Embodiment

An information processor according to a third embodiment of the invention will now be described. In the third embodiment, a virtual machine restores to a normally operating state by notifying the virtual machine control unit of a predetermined priority in the event of a virus-induced failure or an OS failure.

Because the information processor of the third embodiment is of substantially the same configuration as the information processor of the first embodiment shown in FIG. 1, descriptions will be given to a different configuration alone. The third embodiment and the first embodiment above are different in the configuration of the execution context storing unit 50.

Figure 11:
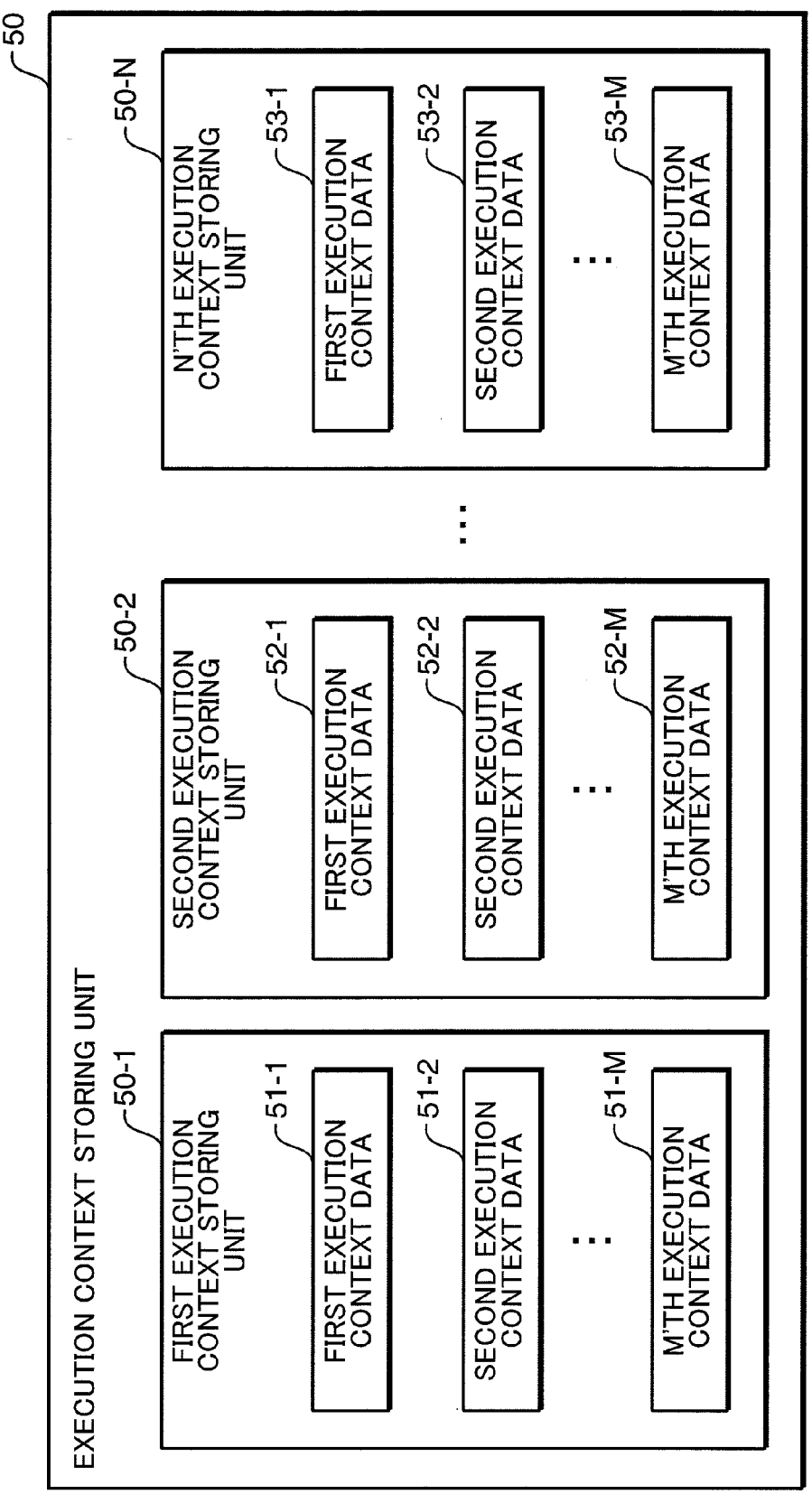
FIG. 11 is a view showing the configuration of an execution context storing unit according to a third embodiment of the invention.

FIG. 11 is a view showing the configuration of the execution context storing unit according to the third embodiment of the invention.

The execution context storing unit 50 stores the execution context saved by the virtual machine control unit 30 for each virtual machine. The execution context storing unit 50 includes a first execution context storing unit 50-1 through an N'th execution context storing unit 50-N in the matching number with the virtual machines. FIG. 11 shows a case where the information processor has three or more virtual machines. It should be appreciated, however, that the invention is not particularly limited to this configuration and the information processor may have two virtual machines as is shown in FIG. 1.

The first execution context storing unit 50-1 stores the execution context of the first virtual machine, the second execution context storing unit 50-2 stores the execution context of the second virtual machine, and the N'th execution context storing unit 50-N stores the execution context of the N'th virtual machine.

In the first embodiment above, the execution context storing unit 50 stores only one execution context for each virtual machine and the execution context is overwritten and stored each time the execution context is saved. By contrast, in the third embodiment, the execution context storing unit 50 stores the execution context in a different region each time the execution context is saved, so that a plurality of execution contexts are stored for each virtual machine.

To be more specific, the first execution context storing unit 50-1 stores first execution context data 51-1 through M'th execution context data 51-M, the second execution context storing unit 50-2 stores first execution context data 52-1 through M'th execution context data 52-M, and the N'th execution context storing unit 50-N stores first execution context data 53-1 through M'th execution context data 53-M.

The number of execution contexts, M, stored in the first execution context storing unit 50-1 through the N'th execution context storing unit 50-N is set preliminarily depending on the memory capacity or the like.

The virtual machine switching unit 301 saves the execution context of the switching source virtual machine into the execution context storing unit 50 from the CPU register. In this instance, the virtual machine switching unit 301 stores the execution context of the switching source virtual machine into a region (any one of the first execution context storing unit 50-1 through the N'th execution context storing unit 50-N) corresponding to the switching source virtual machine in the execution context storing unit 50. Herein, the execution context data is stored as first execution context data for the first time and the execution context is stored as second execution context data next time. In a case where the number of items of data to be saved exceeds M, which is the number secured for the saving for one virtual machine, the execution context is stored again as first execution context data.

In a case where a system abnormality or a system failure is detected, the dummy task is activated regardless of the priority. It should be noted, however, that it is a prerequisite that the dummy task is operable when a system abnormality or a system failure is detected.

In the event of a failure in the virtual machine currently in operation, the virtual machine switching notification unit 111 does not notify the virtual machine priority setting unit 302 of the priority of the top-priority task for the switching source first virtual machine 10 but it notifies the virtual machine priority setting unit 302 of a failure priority indicating the occurrence of a failure in the virtual machine currently in operation.

Subsequently, the virtual machine priority setting unit 302 receives an indication from the virtual machine switching notification unit 111 and in a case where the failure priority indicating the occurrence of a system abnormality or a system failure is contained in the indication, it transfers the processing to the virtual machine switching unit 301 without storing the failure priority into the virtual machine priority storing unit 40.

Subsequently, the virtual machine switching unit 301 restores the execution context of the virtual machine that has transmitted the virtual machine switching notice into the CPU register from the execution context storing unit 50. Herein, the virtual machine switching unit 301 restores the oldest execution context among the execution contexts stored in the execution context storing unit 50 into the CPU register.

In the third embodiment, the oldest execution context among the execution contexts stored in the execution context storing unit 50 is restored into the CPU register. It should be appreciated, however, that the invention is not particularly limited to this configuration and the newest execution context may be restored into the CPU register or an arbitrary execution context may be restored into the CPU register.

In a state where the dummy task is not executed, the virtual machine control unit 30 may detect an abnormally state using a watch dog timer or the like, so that the execution context in a normal state is forcedly restored into the CPU register.

According to the configuration as above, even when a virus-induced failure or an OS failure occurs in a virtual machine, it is possible to restore the virtual machine in a normally operating state.

Fourth Embodiment

In the first embodiment above, one CPU 1 functions as both the first virtual machine 10 and the second virtual machine 20. It should be appreciated, however, that the invention is not particularly limited to this configuration and a plurality of CPU's may function as different virtual machines.

Figure 12:
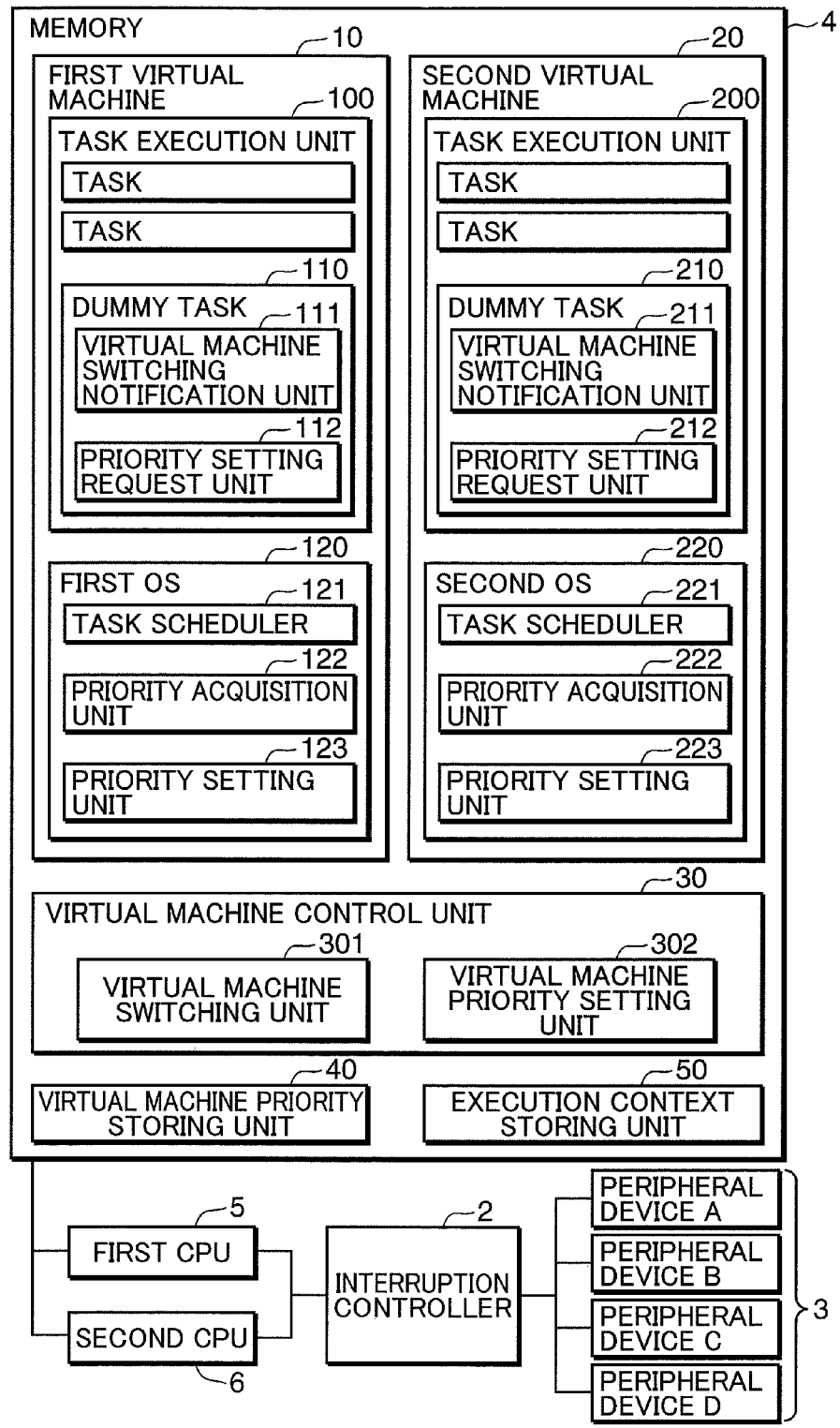
FIG. 12 is a block diagram showing the configuration of an information processor according to a fourth embodiment of the invention.

FIG. 12 is a block diagram showing the configuration of an information processor according to a fourth embodiment of the invention. In the information processor of the fourth embodiment shown in FIG. 12, the same components as those of the information processor of the first embodiment shown in FIG. 1 are labeled with the same reference numerals and detailed descriptions of such components are omitted herein.

The information processor shown in FIG. 12 includes a first CPU 5, a second CPU 6, an interruption controller 2, peripheral devices 3, and a memory 4. In a normal state, the first CPU 5 operates as a first virtual machine 10 and the second CPU 6 operates as a second virtual machine 20. However, in a case where a load on CPU becomes so large and the CPU becomes an idle state in one of the first CPU 5 and the second CPU 6, the other CPU operates as both the first virtual machine 10 and the second virtual machine 20. In this instance, the other CPU performs the switching processing described in the first embodiment above. It should be noted that the virtual machine control unit 30, the virtual machine priority storing unit 40, the execution context storing unit 50 are operated by either one of the first CPU 5 and the second CPU 6.

According to the configuration as described above, even in a case where a plurality of virtual machines are operated by a plurality of CPU's, a plurality of virtual machines can be switched from one another. It thus becomes possible to reduce overheads caused by unnecessary suspension and resumption of the execution context.

The respective components of the information processors of the first through fourth embodiments are typically achieved by software. However, they may be achieved by an LSI, which is an integrated circuit. The respective components may be formed into one chip individually or may be formed into one chip either partially or entirely. Herein, the integrated circuit is referred to as an LSI, but it may be referred to also as an IC, a system LSI, a super LSI, and an ultra LSI depending on a difference of the integration degree. Also, the circuit integration technique is not limited to an LSI, and the technique may be achieved by an exclusive-use circuit or a general processor. Further, an FPGA (Field Programmable Gate Array) that is programmable after the LSI is fabricated or a reconfigurable processor in which the connection and the settings of circuit cells within the LSI are reconfigurable may be used as well. Furthermore, when a novel circuit integration technique replacing the LSI emerges with developments of the semiconductor technology or due to another derivative technology, it goes without saying that the functional blocks is integrated using this novel technique.

The specific embodiments described above chiefly include the inventions having the following configurations.

A virtual machine control device according to an aspect of the invention includes: a plurality of virtual machines each having an operating system that carries out scheduling of tasks to be executed according to priorities of the tasks, and a virtual machine control unit that controls switching of the plurality of virtual machines. Each of the plurality of virtual machines includes a task execution unit that executes a switching task to perform switching processing by which a virtual machine currently in operation is switched to another virtual machine as a switching target, a priority acquisition unit that acquires a priority of a task having a highest priority among executable tasks in the currently running virtual machine, and a priority setting unit that sets the priority acquired by the priority acquisition unit of the another virtual machine to a priority of the switching task. The task execution unit notifies the virtual machine control unit of the priority acquired by the priority acquisition unit and a switching indication to switch the virtual machine currently in operation to the another virtual machine in a case where the switching task is executed according to task scheduling by the operating system. The virtual machine control unit receives the priority and the switching indication notified by the task execution unit and switches the virtual machine currently in operation to the another virtual machine.

According to this configuration, each of a plurality of virtual machines includes an operating system that carries out scheduling of tasks to be executed according to priorities of the tasks and the virtual machine control unit controls the switching of a plurality of virtual machines. The task execution unit executes a switching task to perform switching processing by which a virtual machine currently in operation is switched to another virtual machine as a switching target. The priority acquisition unit acquires the priority of a task having a highest priority among executable tasks in the currently running virtual machine. The priority setting unit sets the priority acquired by the priority acquisition unit of another virtual machine to a priority of the switching task. In a case where the task execution unit executes the switching task according to the task scheduling by the operating system, it notifies the virtual machine control unit of the priority acquired by the priority acquisition unit and a switching indication to switch the virtual machine currently in operation to another virtual machine. The virtual machine control unit receives the priority and the switching indication notified by the task execution unit and switches the virtual machine currently in operation to another virtual machine.

Accordingly, the priority of the task having the highest priority for another virtual machine is set to the priority of the switching task and the switching task is executed only when the virtual machines are switched. The number of processing times to suspend and resume the virtual machine can be thus reduced, which makes it possible to reduce overheads needed to switch the virtual machines.

Also, in the virtual machine control device described above, it is preferable that the task execution unit generates the switching task at start-up of the plurality of virtual machines and sets a highest priority to the priority of the generated switching task.

According to this configuration, the switching task is generated at start-up of a plurality of virtual machines and the highest priority is set to the priority of the generated switching task. The switching task is therefore executed first at the start-up of a plurality of virtual machines and it becomes possible to set the priority of the switching task.

Also, in the virtual machine control device described above, it is preferable that the virtual machine control unit includes an interruption reception unit that receives an interruption notice notifying an interruption to the plurality of virtual machines and determines a virtual machine as an interruption target among the plurality of virtual machines using an interruption cause contained in the interruption notice, and an interruption priority storing determination unit that determines whether a priority correlated with the interruption cause is to be set to a priority of the virtual machine as the interruption target.

According to this configuration, the interruption reception unit receives an interruption notice notifying an interruption to a plurality of virtual machines and determines a virtual machine as an interruption target among a plurality of virtual machines using an interruption cause contained in the interruption notice. Also, the interruption priority storing determination unit determines whether the priority correlated with the interruption cause is to be set to the priority of the virtual machine as an interruption target.

Accordingly, in the event of an interruption, whether the priority correlated with the interruption cause is to be set to the priority of the virtual machine as an interruption target is determined. It thus becomes possible to execute the virtual machine as an interruption target preferentially.

Also, in the virtual machine control device described above, it is preferable that the interruption priority storing determination unit determines whether the virtual machine determined as the interruption target by the interruption reception unit is same as a virtual machine that was operating before the interruption, and that the virtual machine control unit further includes a virtual machine priority setting unit that sets, in a case where it is determined that the virtual machine as the interruption target is not same as the virtual machine that was operating before the interruption, the priority correlated with the interruption cause to the priority of the virtual machine as the interruption target.

According to this configuration, it is determined whether the virtual machine determined as an interruption target by the interruption reception unit is the same as a virtual machine that was operating before the interruption. In a case where it is determined that the virtual machine as an interruption target is not the same as the virtual machine that was operating before the interruption, the priority correlated with the interruption cause is set to the priority of the virtual machine as an interruption target.

Accordingly, in a case where the virtual machine as an interruption target is not the same as the virtual machine that was operating before the interruption, it becomes possible to execute the virtual machine as an interruption target different from the virtual machine that was operating before the interruption.

Also, in the virtual machine control device described above, it is preferable that a priority storing unit that stores the priority notified by the task execution unit is further included, and that the virtual machine control unit compares the priority correlated with the interruption cause with the priority stored in the priority storing unit and, in a case where the priority correlated with the interruption cause is higher than the priority stored in the priority storing unit, sets the priority correlated with the interruption cause to the priority of the virtual machine as the interruption target.

According to this configuration, the priority notified by the task execution unit is stored in the priority storing unit. The priority correlated with the interruption cause is compared with the priority stored in the priority storing unit and the priority correlated with the interruption cause is set to the priority of the virtual machine as an interruption target in a case where the priority correlated with the interruption cause is higher than the priority stored in the priority storing unit.

Accordingly, in a case where the priority correlated with the interruption cause is higher than the priority stored in the priority storing unit, the priority correlated with the interruption cause is set to the priority of the virtual machine as an interruption target. Hence, in the event of an interruption, the interruption is not necessarily executed but it is possible to execute the task having a higher priority preferentially.

Also, in the virtual machine control device described above, it is preferable that an execution context storing unit that stores an execution context of each virtual machine is further included, and that the virtual machine control unit saves an execution context corresponding to a virtual machine before switching into the execution context storing unit and restores an execution context corresponding to a virtual machine after switching from the execution context storing unit.

According to this configuration, the execution context of each virtual machine is stored in the execution context storing unit. The execution context corresponding to a virtual machine before the switching is saved into the execution context storing unit and the execution context corresponding to a virtual machine after the switching is restored from the execution context storing unit.

The execution context corresponding to the virtual machine before the switching is therefore saved before the virtual machines are switched. It thus becomes possible to execute the switching task where it was suspended.

Also, in the virtual machine control device described above, it is preferable that: a priority storing unit that stores the priority notified by the task execution unit is further included; the virtual machine control unit saves an execution context corresponding to a virtual machine before switching into the execution context storing unit, stores the priority notified by the task execution unit into the priority storing unit, and restores an execution context corresponding to a virtual machine after switching from the execution context storing unit in a case where the virtual machine control unit receives the priority and the switching indication notified by the task execution unit; the task execution unit included in the virtual machine after the switching resumes the switching task that has been suspended; and the priority setting unit included in the virtual machine after the switching acquires the priority of the virtual machine before the switching stored in the priority storing unit and sets the acquired priority to the priority of the switching task.

According to this configuration, the priority notified by the task execution unit is stored in the task priority storing unit. In a case where the virtual machine control unit receives the priority and the switching indication notified by the task execution unit, it saves the execution context corresponding to the virtual machine before the switching into the execution context storing unit and stores the priority notified by the task execution unit into the priority storing unit. Thereafter, the virtual machine control unit restores the execution context corresponding to the virtual machine after the switching from the execution context storing unit. The task execution unit included in the virtual machine after the switching resumes the suspended switching task while the priority setting unit included in the virtual machine after the switching acquires the priority of the virtual machine before the switching stored in the priority storing unit and sets the acquired priority to the priority of the switching task.

Accordingly, after the execution context corresponding to the virtual machine after the switching is restored from the execution context unit, the suspended switching task of the virtual machine after the switching is resumed and the priority of the virtual machine before the switching is set to the priority of the switching task. It thus becomes possible to set the priority of the task having the highest priority among those for the virtual machine before the switching to the priority of the switching task for the virtual machine after the switching.

Also, in the virtual machine control device described above, it is preferable that: the execution context storing unit stores the execution context saved by the virtual machine control unit for each virtual machine; the task execution unit notifies the virtual machine control unit of a failure priority indicating an occurrence of a failure in a virtual machine currently in operation in a case where the failure occurs in the virtual machine currently in operation; and the virtual machine control unit restores an oldest execution context among execution contexts stored in the execution context storing unit in a case where the virtual machine control unit receives the failure priority notified by the task execution unit.

According to this configuration, the execution context saved by the virtual machine control unit is stored in the execution context storing unit for each virtual machine. In the event of a failure in the virtual machine currently in operation, the task execution unit notifies the virtual machine control unit of the failure priority indicating the occurrence of a failure in the virtual machine currently in operation. In a case where the virtual machine control unit receives the failure priority notified by the task execution unit, it restores the oldest execution context among those stored in the execution context storing unit.

Accordingly, even in the event of a failure in the virtual machine currently in operation, the oldest execution context among those stored in the execution context storing unit is restored. It thus becomes possible to restore the virtual machine to a state before the failure occurs.

A virtual machine control method according to another aspect of the invention is a virtual machine control method of controlling switching of a plurality of virtual machines each including an operating system that carries out scheduling of tasks to be executed according to priorities of the tasks, which includes: a task executing step of executing a switching task to perform switching processing by which a virtual machine currently in operation is switched to another virtual machine as a switching target; a priority acquiring step of acquiring a priority of a task having a highest priority among executable tasks in the currently running virtual machine; a priority setting step of setting the priority acquired in the priority acquiring step by the another virtual machine to a priority of the switching task; a notifying step of notifying the priority acquired in the priority acquiring step and a switching indication to switch the virtual machine currently in operation to the another virtual machine in a case where the switching task is executed according to task scheduling by the operating system; and a switching step of receiving the priority and the switching indication notified in the notifying step and switching the virtual machine currently in operation to the another virtual machine.

According to this configuration, in the task execution step, a switching task to perform the switching processing is executed, by which a virtual machine currently in operation is switched to another virtual machine as a switching target. In the priority acquiring step, the priority of a task having the highest priority among executable tasks in the currently running virtual machine is acquired. In the priority setting step, the priority acquired in the priority acquiring step by another virtual machine is set to the priority of the switching task. In the notifying step, in a case where the switching task is executed according to the task scheduling by the operating system, the priority acquired in the priority acquiring step and a switching indication to switch the virtual machine currently in operation to another virtual machine are notified. In the switching step, the priority and the switching indication notified in the notifying step are received and the virtual machine currently in operation is switched to another virtual machine.

Accordingly, the priority of a task having the highest priority in another virtual machine is set to the priority of the switching task and the switching task is executed only when the virtual machines are switched. The number of processing times to suspend and resume the virtual machine is thus reduced, which makes it possible to reduce overheads needed to switch the virtual machines.

A virtual machine control program according to still another aspect of the invention causes a computer to function as a plurality of virtual machines each having an operating system that carries out scheduling of tasks to be executed according to priorities of the tasks, and a virtual machine control unit that controls switching of the plurality of virtual machines. Each of the plurality of virtual machines includes a task execution unit that executes a switching task to perform switching processing by which a virtual machine currently in operation is switched to another virtual machine as a switching target, a priority acquisition unit that acquires a priority of a task having a highest priority among executable tasks in the currently running virtual machine, and a priority setting unit that sets the priority acquired by the priority acquisition unit of the another virtual machine to a priority of the switching task. The task execution unit notifies the virtual machine control unit of the priority acquired by the priority acquisition unit and a switching indication to switch the virtual machine currently in operation to the another virtual machine in a case where the switching task is executed according to task scheduling by the operating system. The virtual machine control unit receives the priority and the switching indication notified by the task execution unit and switches the virtual machine currently in operation to the another virtual machine.

According to this configuration, each of a plurality of virtual machines includes an operating system that carries out scheduling of tasks to be executed according to priorities of the tasks and the virtual machine control unit controls the switching of a plurality of virtual machines. The task execution unit executes a switching task to perform switching processing by which a virtual machine currently in operation is switched to another virtual machine as a switching target. The priority acquisition unit acquires the priority of a task having a highest priority among executable tasks in the currently running virtual machine. The priority setting unit sets the priority acquired by the priority acquisition unit of another virtual machine to a priority of the switching task. In a case where the task execution unit executes the switching task according to the task scheduling by the operating system, it notifies the virtual machine control unit of the priority acquired by the priority acquisition unit and a switching indication to switch a virtual machine currently in operation to another virtual machine. The virtual machine control unit receives the priority and the switching indication notified by the task execution unit and switches the virtual machine currently in operation to another virtual machine.

Accordingly, the priority of the task having the highest priority for another virtual machine is set to the priority of the switching task and the switching task is executed only when the virtual machines are switched. The number of processing times to suspend and resume the virtual machine can be thus reduced, which makes it possible to reduce overheads needed to switch the virtual machines.

It should be appreciated that specific embodiments and examples above to implement the invention have been described for the purpose of illustrating the manner in which the technical content of the invention becomes obvious. It is therefore understood that the invention is not construed limitedly by such examples and the invention can be modified in various manners within the sprit of the invention and the scope of the appended claims.

The virtual machine control device, the virtual machine control method, and the virtual machine control program of the invention are useful for a large-scaled computing machine and a personal computer having a plurality of virtual machines. The virtual machine control device, the virtual machine control method, and the virtual machine control program of the invention are also useful for household electrical appliances, such as AV equipment, communication equipment, such as a mobile phone, industrial equipment, and passenger equipment.

The invention claimed is:

1. A virtual machine control device, comprising:
   a plurality of virtual machines each having an operating system that carries out scheduling of tasks to be executed according to priorities of the tasks; and
   a virtual machine control unit that controls switching of the plurality of virtual machines,
   wherein at least one of the plurality of virtual machines includes:
   a switching task generation unit that generates a switching task that performs a process of notifying the virtual machine control unit of a switching indication for switching a virtual machine currently in operation to another virtual machine as a switching target,
   a priority setting unit that sets a priority of the switching task generated by the switching task generation unit to a priority of a task having a highest priority among tasks for the another virtual machine, and
   a task execution unit that sequentially executes one or more tasks including the switching task according to the priorities preset for each of the tasks,
   wherein the task execution unit executes the switching task in a case where a priority set for the switching task is higher than a priority set for another task in the virtual machine including the switching task to thereby notify the virtual machine control unit of the switching indication, and
   wherein the virtual machine control unit receives the notified switching indication and switches the currently running virtual machine to the another virtual machine.

2. The virtual machine control device according to claim 1, wherein
   the at least one of the plurality of virtual machines further includes a priority acquisition unit that acquires a priority of a task having a highest priority among executable tasks in the currently running virtual machine, as a priority set for a switching task included in the another virtual machine.

3. The virtual machine control device according to claim 2, wherein
   the switching task notifies the virtual machine control unit of the priority acquired by the priority acquisition unit and the switching indication, in a case where the switching task is executed according to task scheduling of the operating system, and
   the virtual machine control unit receives the notified priority and the notified switching indication and switches the currently running virtual machine to the another virtual machine.

4. The virtual machine control device according to claim 1, wherein the switching task generation unit generates the switching task at start-up of the plurality of virtual machines and sets the priority of the generated switching task to a highest priority.

5. The virtual machine control device according to claim 1, wherein the virtual machine control unit includes:
   an interruption reception unit that receives an interruption notice notifying of an interruption to the plurality of virtual machines and determines a virtual machine as an interruption target among the plurality of virtual machines using a cause of the interruption contained in the interruption notice; and
   an interruption priority storing determination unit that determines whether a priority of the virtual machine as the interruption target is to be set to a priority correlated with the cause of the interruption.

6. The virtual machine control device according to claim 5, wherein
   the interruption priority storing determination unit determines whether the virtual machine determined as the interruption target by the interruption reception unit is the same as a virtual machine that was operating before the interruption; and
   the virtual machine control unit further includes a virtual machine priority setting unit that sets, in a case where it is determined that the virtual machine as the interruption target is not the same as the virtual machine that was operating before the interruption, the priority of the virtual machine as the interruption target to the priority correlated with the cause of the interruption.

7. The virtual machine control device according to claim 5, further comprising:
a priority storing unit that stores the priority notified by the task execution unit,
wherein the virtual machine control unit further includes a virtual machine priority setting unit that compares the priority correlated with the cause of the interruption with the priority stored in the priority storing unit and, in a case where the priority correlated with the cause of the interruption is higher than the priority stored in the priority storing unit, sets the priority of the virtual machine as the interruption target to the priority correlated with the cause of the interruption.

8. The virtual machine control device according to claim 1, further comprising:
an execution context storing unit that stores an execution context of each virtual machine,
wherein the virtual machine control unit saves an execution context corresponding to a virtual machine before switching into the execution context storing unit and restores an execution context corresponding to a virtual machine after switching from the execution context storing unit.

9. The virtual machine control device according to claim 8, further comprising:
a priority storing unit that stores the priority notified by the task execution unit, wherein
the virtual machine control unit saves an execution context corresponding to a virtual machine before switching into the execution context storing unit, stores the priority notified by the task execution unit into the priority storing unit, and restores an execution context corresponding to a virtual machine after switching from the execution context storing unit in a case where the virtual machine control unit receives the priority and the switching indication notified by the task execution unit;
the task execution unit included in the virtual machine after the switching resumes the switching task that has been suspended; and
the priority setting unit included in the virtual machine after the switching acquires the priority of the virtual machine before the switching stored in the priority storing unit and sets the priority of the switching task to the acquired priority.

10. The virtual machine control device according to claim 8, wherein
the execution context storing unit stores the execution context saved by the virtual machine control unit for each virtual machine;
the task execution unit notifies the virtual machine control unit of a failure priority indicating an occurrence of a failure in a virtual machine currently in operation in a case where the failure occurs in the virtual machine currently in operation; and
the virtual machine control unit restores an oldest execution context among execution contexts stored in the execution context storing unit in a case where the virtual machine control unit receives the failure priority notified by the task execution unit.

11. A virtual machine control method of controlling switching of a plurality of virtual machines each including an operating system that carries out scheduling of tasks to be executed according to priorities of the tasks, using at least one of the plurality of virtual machines, the virtual machine control method comprising:
a generation step of generating a switching task that performs a process of notifying a virtual machine control unit, for controlling switching of the plurality of virtual machines, of a switching indication for switching a virtual machine currently in operation to another virtual machine as a switching target;
a priority setting step of setting a priority of the switching task generated in the generation step to a priority of a task having a highest priority among the tasks for the another virtual machine;
a task execution step of sequentially executing one or more tasks including the switching task according to the priorities preset for each of the tasks, and executing the switching task in a case where a priority set for the switching task is higher than a priority set for another task in the virtual machine including the switching task to thereby notify the virtual machine control unit of the switching indication; and
a switching step of receiving the notified switching indication and switching the currently running virtual machine to the another virtual machine.

12. A non-transitory computer readable recording medium storing a virtual machine control program for causing a computer to function as at least:
a plurality of virtual machines each having an operating system that carries out scheduling of tasks to be executed according to priorities of the tasks; and
a virtual machine control unit that controls switching of the plurality of virtual machines,
wherein at least one of the plurality of virtual machines includes:
a switching task generation unit that generates a switching task that performs a process of notifying the virtual machine control unit of a switching indication for switching a virtual machine currently in operation to another virtual machine as a switching target,
a priority setting unit that sets a priority of the switching task generated by the switching task generation unit to a priority of a task having a highest priority among tasks for the another virtual machine, and
a task execution unit that sequentially executes one or more tasks including the switching task according to the priorities preset for each of the tasks,
wherein the task execution unit executes the switching task in a case where a priority set for the switching task is higher than a priority set for another task in the virtual machine including the switching task to thereby notify the virtual machine control unit of the switching indication, and
wherein the virtual machine control unit receives the notified switching indication and switches the currently running virtual machine to the another virtual machine.

* * * * *